(12) United States Patent
Islam et al.

(10) Patent No.: US 10,149,321 B2
(45) Date of Patent: Dec. 4, 2018

(54) MULTIPLE TIMERS FOR REQUEST TO SEND AND CLEAR TO SEND COMMUNICATIONS

(71) Applicant: QUALCOMM Incorporated, San Diego, CA (US)

(72) Inventors: Muhammad Nazmul Islam, Edison, NJ (US); Junyi Li, Chester, NJ (US); Sundar Subramanian, Bridgewater, NJ (US); Jung Ryu, Fort Lee, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 15/427,839

(22) Filed: Feb. 8, 2017

(65) Prior Publication Data
US 2018/0098355 A1  Apr. 5, 2018

Related U.S. Application Data

(60) Provisional application No. 62/402,829, filed on Sep. 30, 2016.

(51) Int. Cl.
*H04W 4/00* (2018.01)
*H04W 74/08* (2009.01)
(Continued)

(52) U.S. Cl.
CPC ....... *H04W 74/0808* (2013.01); *H04W 24/08* (2013.01); *H04W 74/0816* (2013.01); *H04W 76/10* (2018.02)

(58) Field of Classification Search
CPC ............. H04W 74/0808; H04W 24/08; H04W 74/0816; H04W 76/10
See application file for complete search history.

(56) References Cited

U.S. PATENT DOCUMENTS 7,509,150 B1  3/2009 Simmons
9,345,026 B2  5/2016 Asterjadhi et al.
(Continued)

FOREIGN PATENT DOCUMENTS

WO  WO-2015141292 A1  9/2015
WO  WO-2016140761 A1  9/2016

OTHER PUBLICATIONS

ISA/EP, International Search Report and Written Opinion of the International Searching Authority, Int'l Application No. PCT/US2017/053154, dated Dec. 1, 2017, European Patent Office, Rijswijk, NL, 15 pgs.

(Continued)

*Primary Examiner* — Afshawn M Towfighi
(74) *Attorney, Agent, or Firm* — Holland & Hart LLP

(57) ABSTRACT

Techniques for procedures using request to send/clear to send (RTS/CTS) procedures and multiple timers are described. A RTS/CTS procedure using multiple timers may use a first timer and a second timer. The first timer may be associated with a duration to transmit and receive a request to send (RTS) message and a clear to send (CTS) message. The second timer may be associated with a duration to transmit a data message. A network device may transmit a RTS message to request communication resources to transmit data. If the CTS message is not received prior to the expiration of the first timer, neighboring network devices may determine that the communication resources were not allocated and may attempt to request the newly available resources. If a CTS message is received, the network device may communicate the second timer data to the neighboring network devices in a variety of ways.

86 Claims, 28 Drawing Sheets

(51) Int. Cl.
*H04W 76/10* (2018.01)
*H04W 24/08* (2009.01)

(56) References Cited

U.S. PATENT DOCUMENTS

2007/0002887 A1* 1/2007 Benveniste ............ H04W 74/00
370/437
2014/0334387 A1 11/2014 Doppler et al.
2015/0063251 A1 3/2015 Asterjadhi
2016/0119953 A1 4/2016 Merlin et al.
2017/0079066 A1 3/2017 Takano

OTHER PUBLICATIONS

Jasani et al., "Evaluating the Performance of IEEE 802.11 Network Using RTS/CTS Mechanism," 2007 IEEE International Conference on Electro/Information Technology, May 1, 2007, pp. 616-621, XP031156084, ISBN: 978-1-4244-0940-2, Institute of Electrical and Electronics Engineers.

* cited by examiner

500

MULTIPLE TIMERS FOR REQUEST TO SEND AND CLEAR TO SEND COMMUNICATIONS

CROSS REFERENCES

The present application for patent claims priority to U.S. Provisional Patent Application No. 62/402,829 by ISLAM, et al., entitled "MULTIPLE TIMERS FOR REQUEST TO SEND AND CLEAR TO SEND COMMUNICATIONS," filed Sep. 30, 2016, assigned to the assignee hereof, and which is expressly incorporated by reference herein.

BACKGROUND

The following relates generally to wireless communication, and more specifically to multiple timers for request to send and clear to send communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

Some communication systems may allocate communication resources using a contention-based system. For example, when communication resources become available, one or more devices may request to use the available resources by transmitting a request to send message to another device. The other device may grant communication resources to one of the requesting devices and may transmit a clear to send message. Some timers used to avoid collisions in such a contention-based system, however, may create inefficient allocations of communication resources.

SUMMARY

The described techniques relate to improved methods, systems, devices, and apparatuses that support multiple timers for request to send and clear to send communications. Techniques for a procedure using multiple timers and a request to send (RTS)/clear to send (CTS) procedure are described. A procedure using RTS/CTS and multiple timers may use a first timer and a second timer. The first timer may be associated with a duration to transmit a RTS message and receive a CTS message, among other operations. The second timer may be associated with a duration to transmit a data message, among other operations. A network device may transmit a RTS message to request communication resources. If the CTS message is not received before the expiration of the first timer, neighboring network devices may determine that the communication resources were not allocated and may attempt to request the newly available resources and/or may initiate one or more transmission. If a CTS message is received, the network device may communicate data related to a second timer to one or more other devices in a variety of ways.

A method of wireless communication is described. The method may include determining a first timer based at least in part on a duration for transmitting a first request to send (RTS) message and a duration for receiving a clear to send (CTS) message, transmitting the first RTS message associated with the first timer, receiving the CTS message before an expiration of the first timer based at least in part on the first RTS message, and transmitting, in response to receiving the CTS message, a data message having a second timer different from the first timer, the data message associated with a data transmission opportunity for the UE.

An apparatus for wireless communication is described. The apparatus may include means for determining a first timer based at least in part on a duration for transmitting a first RTS message and a duration for receiving a CTS message, means for transmitting the first RTS message associated with the first timer, means for receiving the CTS message before an expiration of the first timer based at least in part on the first RTS message, and means for transmitting, in response to receiving the CTS message, a data message having a second timer different from the first timer, the data message associated with a data transmission opportunity for the UE.

Another apparatus for wireless communication is described. The apparatus may include a processor, memory in electronic communication with the processor, and instructions stored in the memory. The instructions may be operable to cause the processor to determine a first timer based at least in part on a duration for transmitting a first RTS message and a duration for receiving a CTS message, transmit the first RTS message associated with the first timer, receive the CTS message before an expiration of the first timer based at least in part on the first RTS message, and transmit, in response to receiving the CTS message, a data message having a second timer different from the first timer, the data message associated with a data transmission opportunity for the UE.

A non-transitory computer readable medium for wireless communication is described. The non-transitory computer-readable medium may include instructions operable to cause a processor to determine a first timer based at least in part on a duration for transmitting a first RTS message and a duration for receiving a CTS message, transmit the first RTS message associated with the first timer, receive the CTS message before an expiration of the first timer based at least in part on the first RTS message, and transmit, in response to receiving the CTS message, a data message having a second timer different from the first timer, the data message associated with a data transmission opportunity for the UE.

In some examples of the method, apparatus, and non-transitory computer-readable medium described above, the second timer comprises a network allocation vector (NAV) timer.

In some examples of the method, apparatus, and non-transitory computer-readable medium described above, the data message comprises a second RTS message.

In some examples of the method, apparatus, and non-transitory computer-readable medium described above, the second timer may have a longer duration than the first timer.

In some examples of the method, apparatus, and non-transitory computer-readable medium described above, the data message comprises information indicating a duration of the second timer.

Some examples of the method, apparatus, and non-transitory computer-readable medium described above may further include processes, features, means, or instructions for identifying a duration of the data transmission opportunity for the UE. Some examples of the method, apparatus, and non-transitory computer-readable medium described above may further include processes, features, means, or instructions for determining the second timer based at least in part on the duration of the data transmission opportunity.

Some examples of the method, apparatus, and non-transitory computer-readable medium described above may further include processes, features, means, or instructions for establishing a directional communication link with a base station, the directional communication link using a first set of communication resources.

Some examples of the method, apparatus, and non-transitory computer-readable medium described above may further include processes, features, means, or instructions for measuring a channel condition associated with the directional communication link, wherein transmitting the first RTS message may be based at least in part on the measured channel condition associated with the directional communication link.

Some examples of the method, apparatus, and non-transitory computer-readable medium described above may further include processes, features, means, or instructions for identifying that a radio link failure event associated with the directional communication link may have occurred, wherein transmitting the first RTS message may be based at least in part on identifying that the radio link failure event occurred.

In some examples of the method, apparatus, and non-transitory computer-readable medium described above, transmitting the first RTS message further comprises: transmitting the first RTS message using a second set of communication resources different than the first set of communication resources.

In some examples of the method, apparatus, and non-transitory computer-readable medium described above, the first set of communication resources comprise a first radio access technology (RAT). In some examples of the method, apparatus, and non-transitory computer-readable medium described above, the second set of communication resources comprise a second RAT different from the first RAT.

In some examples of the method, apparatus, and non-transitory computer-readable medium described above, the first RTS message, the CTS message, and the data message may be transmitted using a cellular radio access technology.

Some examples of the method, apparatus, and non-transitory computer-readable medium described above may further include processes, features, means, or instructions for comparing a duration of the data message to a threshold. Some examples of the method, apparatus, and non-transitory computer-readable medium described above may further include processes, features, means, or instructions for determining the second timer based at least in part on the duration of the data message exceeding the threshold.

Some examples of the method, apparatus, and non-transitory computer-readable medium described above may further include processes, features, means, or instructions for determining a size of data associated with the data message, if the size may be less than a threshold then: determining the first timer based at least in part on the duration for transmitting the first RTS message, the duration for receiving the CTS message, and the duration for transmitting the data message. Some examples of the method, apparatus, and non-transitory computer-readable medium described above may further include processes, features, means, or instructions for transmitting the first RTS message associated with the first timer. Some examples of the method, apparatus, and non-transitory computer-readable medium described above may further include processes, features, means, or instructions for transmitting, in response to receiving the CTS message, the data message; and. Some examples of the method, apparatus, and non-transitory computer-readable medium described above may further include processes, features, means, or instructions for if the size may be greater than the threshold then: determining the first timer based at least in part on the duration for transmitting the first RTS message and the duration for receiving the CTS message. Some examples of the method, apparatus, and non-transitory computer-readable medium described above may further include processes, features, means, or instructions for transmitting the first RTS message associated with the first timer. Some examples of the method, apparatus, and non-transitory computer-readable medium described above may further include processes, features, means, or instructions for receiving the CTS message before the expiration of the first timer. Some examples of the method, apparatus, and non-transitory computer-readable medium described above may further include processes, features, means, or instructions for transmitting, in response to receiving the CTS message, the data message having the second timer different from the first timer.

Some examples of the method, apparatus, and non-transitory computer-readable medium described above may further include processes, features, means, or instructions for identifying a size of data associated with the data message. Some examples of the method, apparatus, and non-transitory computer-readable medium described above may further include processes, features, means, or instructions for comparing the size to a threshold, wherein the first timer, or the second timer, or both may be based at least in part on the comparison.

Some examples of the method, apparatus, and non-transitory computer-readable medium described above may further include processes, features, means, or instructions for setting the second timer based at least in part on the size being less than the threshold.

Some examples of the method, apparatus, and non-transitory computer-readable medium described above may further include processes, features, means, or instructions for setting the second timer based at least in part on the size being greater than the threshold.

Some examples of the apparatus described above may further include an antenna, or a display, or a user interface, or a combination thereof.

A method of wireless communication is described. The method may include receiving a RTS message having a first timer based at least in part on a duration for receiving the RTS message and a duration for transmitting a CTS message, transmitting the CTS message before an expiration of the first timer based at least in part on the RTS message, and receiving a data message having a second timer different from the first timer, the data message associated with a data transmission opportunity for a user equipment (UE).

An apparatus for wireless communication is described. The apparatus may include means for receiving a RTS message having a first timer based at least in part on a duration for receiving the RTS message and a duration for transmitting a CTS message, means for transmitting the CTS message before an expiration of the first timer based at least in part on the RTS message, and means for receiving a data message having a second timer different from the first timer, the data message associated with a data transmission opportunity for a UE.

Another apparatus for wireless communication is described. The apparatus may include a processor, memory in electronic communication with the processor, and instructions stored in the memory. The instructions may be operable to cause the processor to receive a RTS message having a first timer based at least in part on a duration for receiving the RTS message and a duration for transmitting a CTS message, transmit the CTS message before an expiration of the first timer based at least in part on the RTS message, and receive a data message having a second timer different from the first timer, the data message associated with a data transmission opportunity for a UE.

A non-transitory computer readable medium for wireless communication is described. The non-transitory computer-readable medium may include instructions operable to cause a processor to receive a RTS message having a first timer based at least in part on a duration for receiving the RTS message and a duration for transmitting a CTS message, transmit the CTS message before an expiration of the first timer based at least in part on the RTS message, and receive a data message having a second timer different from the first timer, the data message associated with a data transmission opportunity for a UE.

In some examples of the method, apparatus, and non-transitory computer-readable medium described above, the second timer comprises a NAV timer.

Some examples of the method, apparatus, and non-transitory computer-readable medium described above may further include processes, features, means, or instructions for receiving the data message during the second timer.

In some examples of the method, apparatus, and non-transitory computer-readable medium described above, at least a part of the data message may be received from the UE, in response to the second RTS message, before transmitting a second CTS message.

In some examples of the method, apparatus, and non-transitory computer-readable medium described above, the data message comprises information indicating a duration of the second timer.

Some examples of the method, apparatus, and non-transitory computer-readable medium described above may further include processes, features, means, or instructions for remaining idle during the indicated duration of the second timer in response to receiving the data message.

In some examples of the method, apparatus, and non-transitory computer-readable medium described above, the second timer may be longer than the first timer.

In some examples of the method, apparatus, and non-transitory computer-readable medium described above, the data message comprises a second RTS message.

Some examples of the method, apparatus, and non-transitory computer-readable medium described above may further include processes, features, means, or instructions for establishing a directional communication link with the UE, the directional communication link using a first set of communication resources, wherein the RTS message may be received using a second set of communication resources different than the first set of communication resources.

Some examples of the method, apparatus, and non-transitory computer-readable medium described above may further include processes, features, means, or instructions for determining whether a keepalive message may have been received from the UE, wherein transmitting the CTS message may be based at least in part on the keepalive message.

Some examples of the apparatus described above may further include an antenna, or a display, or a user interface, or a combination thereof.

DETAILED DESCRIPTION

Figure 1:
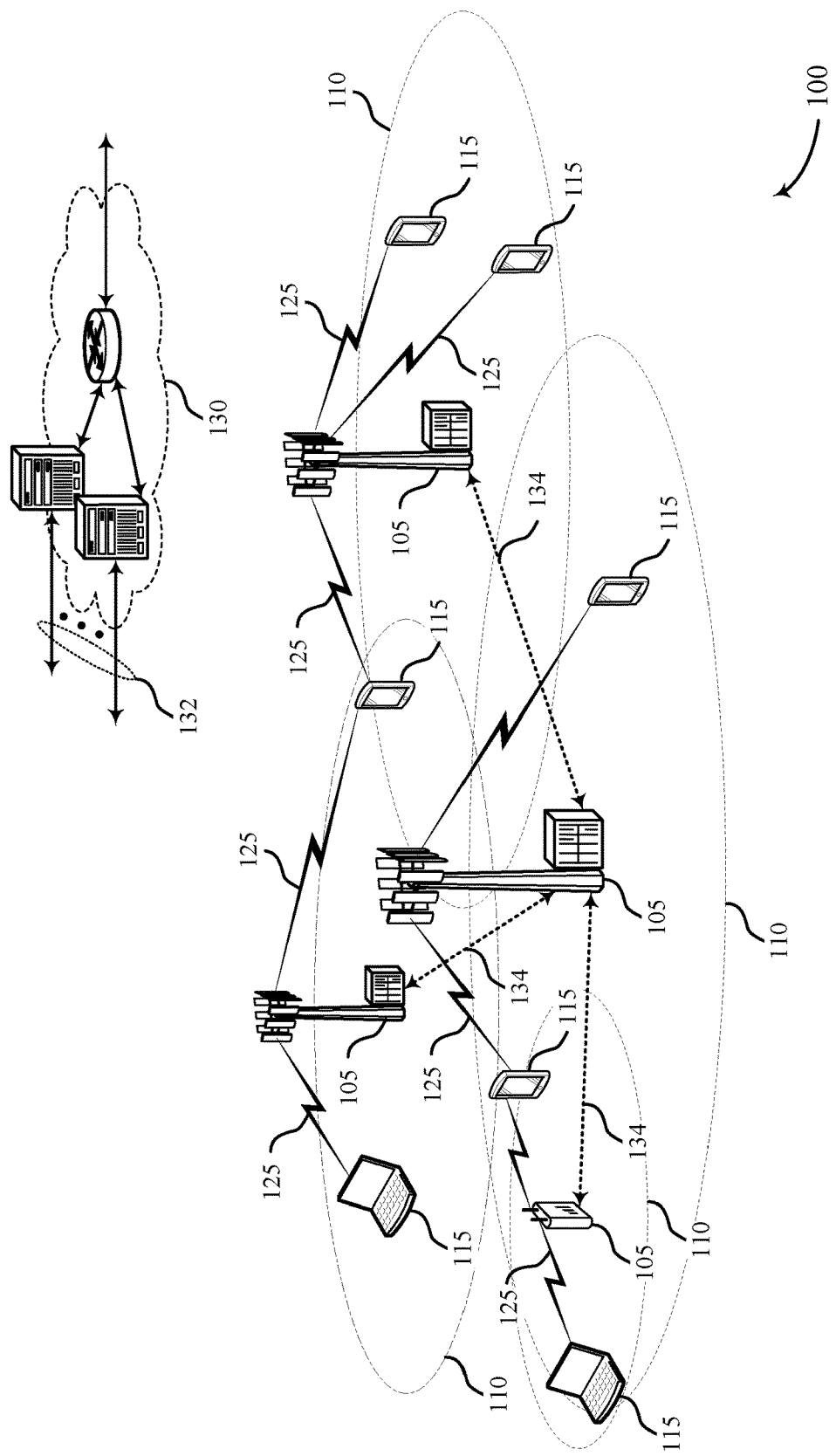
FIG. 1 illustrates an example of a system for wireless communication that supports multiple timers used for request to send and clear to send communications in accordance with various aspects of the present disclosure.

Some techniques using RTS/CTS procedures may use a single timer and may cause inadequate or inefficient use of some communication resources in some instances. Techniques described in present disclosure relate to a RTS/CTS procedure that includes multiple timers to more efficiently allocate communication resources.

In a RTS/CTS procedure, a UE may transmit a RTS message to a base station to request communication resources to transmit data to an intended recipient. The base station may transmit a CTS message allocating some communication resources to the UE. To avoid collisions between different UEs trying to use communication resources, the RTS message may include timer data that indicates a duration associated with the RTS and a related CTS. Neighboring UEs that receive the RTS message from the UE may silence communications during a requested duration based at least in part on the timer data included in the RTS message.

In other RTS/CTS procedures the timer data may include a duration that spans at least from the transmission/reception of the RTS message to an expected conclusion of the transmission/reception of the data message. In some instances, however, the requesting device (e.g., a UE) does not receive a CTS message. Because the neighboring UEs have already silenced their communications for an extended duration that expected the exchange of data, the resources that the UE initially requested may go unused—creating inefficiency.

The present disclosure describes techniques based on a procedure (e.g., a RTS/CTS-based procedure) using multiple timers. For example, a RTS/CTS procedure may use two timers instead of one. The first timer may be associated with a duration to transmit and receive the RTS message and the CTS message, respectively. The second timer may be associated with a duration to transmit a data message, among other information. If the CTS message is not received before the expiration of the first timer, neighboring UEs may determine that the requesting UE was not granted access to the requested communication resources. The communication resources—including those that may have otherwise been allocated for one or more data transmissions—are available to be used by the neighboring UEs. In some examples, the neighboring UEs may generate and transmit their own RTS messages requesting the newly available resources or in some instances may initiate one or more transmissions.

In the event that the requesting UE is granted permission to transmit its data, the UE may communicate the data to the another device or other devices in a variety of ways. In some examples, the data related to or included in the second timer may be included in the data message itself. The neighboring UEs may silence their communications during the duration of the second timer. The use of multiple timers may allow a RTS/CTS procedure to more efficiently allocate communication resources and prevent allocating resources unnecessarily.

Aspects of the disclosure are initially described in the context of a wireless communications system. Aspects of the disclosure are further illustrated by and described with reference to packet structures and communication schemes that relate to multiple timers used for request to send and clear to send communications. Aspects of the disclosure are further illustrated by and described with reference to apparatus diagrams, system diagrams, and flowcharts that relate to multiple timers for request to send and clear to send communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network. The UEs may contend for access to communication resources using a RTS/CTS procedure. A RTS/CTS procedure may use multiple timers to more efficiently allocate communication resources between UEs contending for those resources. A base station may generate and transmit CTS messages based at least in part on received RTS messages. If the CTS message is not received prior to an expiration of a first timer, other UEs may attempt to request the communication resources not granted to the sender of the RTS request.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like. In some examples, the UE 115 may include an antenna, or a display, or a user interface, or a combination thereof.

Base stations 105 may communicate with the core network 130 and with one another. For example, base stations 105 may interface with the core network 130 through backhaul links 132 (e.g., S1). Base stations 105 may communicate with one another over backhaul links 134 (e.g., X2) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Figure 2:
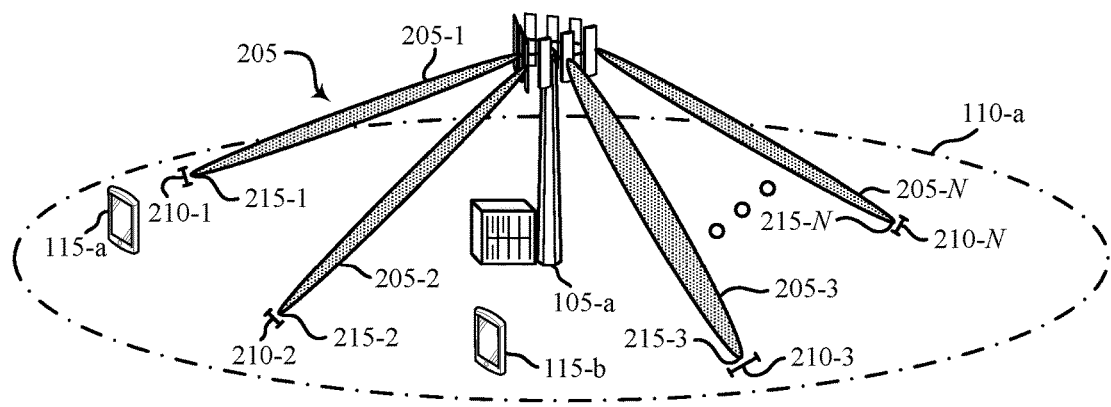
FIG. 2 illustrates an example of a block diagram of a wireless communication system that supports multiple timers used for request to send and clear to send communications in accordance with various aspects of the present disclosure.

FIG. 2 illustrates an example of a wireless communications system 200 for multiple timers used for request to send and clear to send communications in accordance with various aspects of the present disclosure. The wireless communications system 200 may be an example of the wireless communications system 100 discussed with reference to FIG. 1. The wireless communications system 200 may include a base station 105-a, a UE 115-a, and a UEs 115-b. A coverage area 110-a may be defined for the base station 105-a. The UE 115-a may refer to a transmitting UE that is attempting to secure available resources via a RTS message. The UE 115-b may refer to a receiving UE that receives the RTS message from the UE 115-a. In some examples, the UE 115-b may be the transmitting UE and the UE 115-a may be the receiving UE. While two UEs 115 are shown, the wireless communications system 200 may include additional UEs 115, including UEs 115 transmitting RTS messages and UEs 115 receiving RTS messages. In some examples, the same UE 115 may both transmit and receive RTS messages. The base station 105-a may be an example of the base stations 105 described with reference to FIG. 1. The UEs 115-a and 115-b may be examples of the UEs 115 described with reference to FIG. 1.

In some examples, the base station 105-a may communicate with the UE 115-a or the UE 115-b via directional communication links 205 (sometimes referred to as directional wireless beams or directional beams). The directional communication links 205 may be pointed in a specific direction and provide high-bandwidth links between the base station 105-a and the UE 115-a. Signal processing techniques, such as beamforming, may be used to coherently combine energy to form the directional communication links 205. Wireless communication links achieved through beamforming may be associated with narrow beams (e.g., "pencil beams") that are highly directional, minimize inter-link interference, and provide high-bandwidth links between wireless nodes (e.g., base stations, access nodes, UEs).

In some examples, the base station 105-a may operate in millimeter wave (mmW) frequency ranges, e.g., 28 GHz, 40 GHz, 60 GHz. In some examples, the directional communication links 205 are transmitted using frequencies greater than 6 GHz. Wireless communication at these frequencies may be associated with increased signal attenuation, e.g., path loss, which may be influenced by various factors, such as temperature, barometric pressure, diffraction. Dynamic beam-steering and beam-search capabilities may additionally or alternatively support, for example, discovery, link establishment, and beam refinement in the presence of dynamic shadowing and Rayleigh fading. Additionally, communication in such mmW systems may be time division multiplexed, where a transmission may be directed to one wireless device at a time due to the directionality of the transmitted signal.

Each directional communication link 205 may have beam characteristics such as a width 210 and a direction 215 (e.g., an absolute direction based on a coordinate system such as compass directions or a relative direction) where the directional communication link 205 is pointed. The width 210 for each directional communication link 205 may be different (e.g., compare the width 210-1 of the directional communication link 205-1 to the width 210-3 of the directional communication link 205-3). The width 210 of the directional communication link 205 may be expressed in degrees. The width 210 of the directional communication link 205 may be expressed in other ways such as a dimension (e.g., a distance) of the beam at a given point. The width 210 may be related to the size of the phased array antenna used to generate the directional communication link 205. Different widths 210 may be used by the base station 105-a in different scenarios.

For example, a first message may be transmitted/received using a directional wireless beam having a first beam width, while a second message may be transmitted/received using a directional wireless beam having a second beam width different than the first beam width. The base station 105-a may generate any number of directional communication links 205 (e.g., directional communication link 205-N). The directional communication links 205 generated by the base station 105-a may be pointed at any geographic location.

The direction 215 may refer to a target of the directional communication link 205. The direction 215 of the directional transmission may be a location of a UE 115-a. The direction 215 may be any location in a three-dimensional space. For example, the direction 215 may include a pitch parameter indicative of a vertical pitch of the directional communication link 205 and a position vector indicative of a direction that the directional communication link 205 is pointing (e.g., a direction on a compass).

Figure 3:
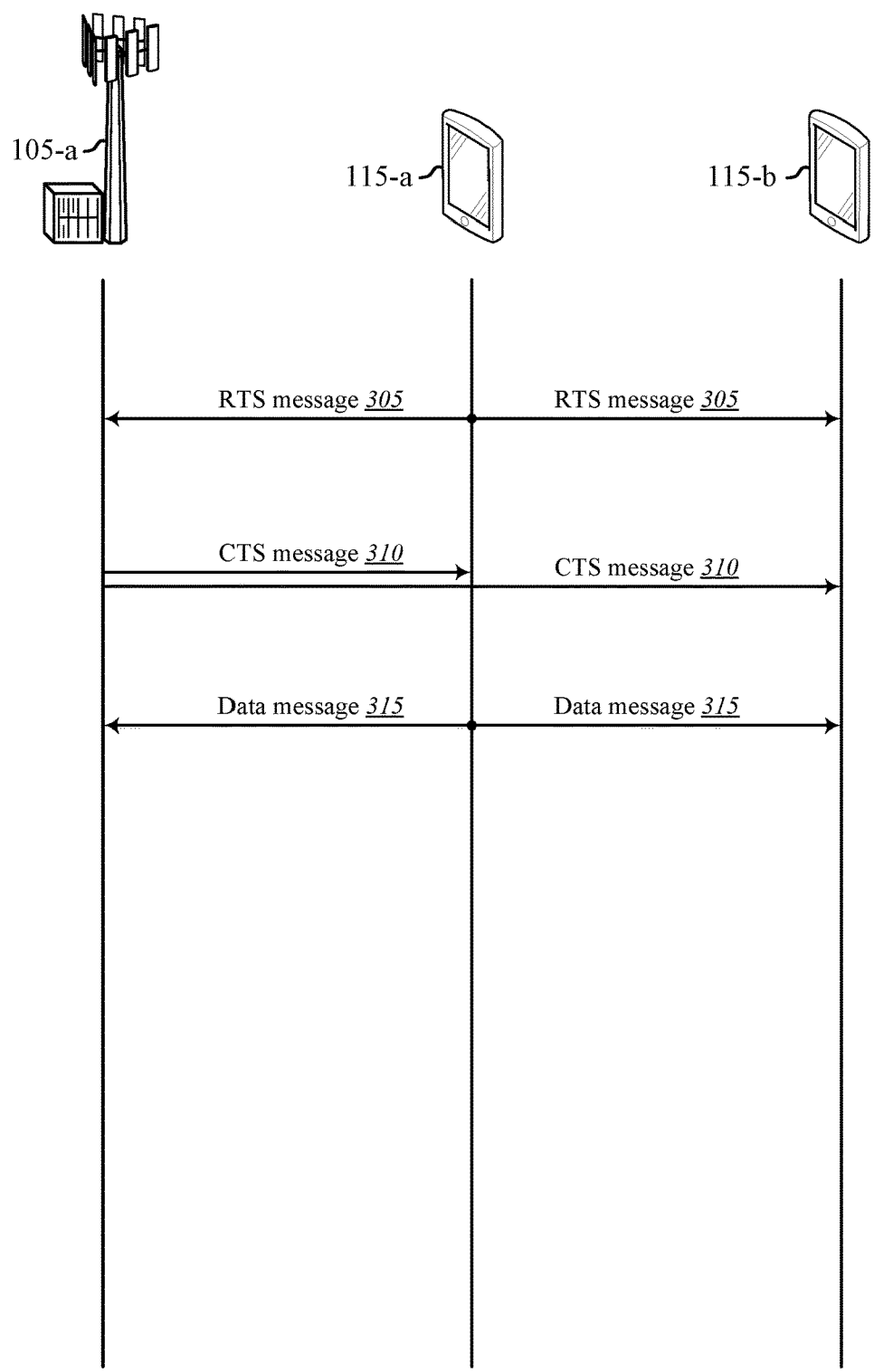
FIG. 3 illustrates an example of a communication scheme that supports multiple timers used for request to send and clear to send communications in accordance with various aspects of the present disclosure.

FIG. 3 illustrates an example of a communication scheme 300 for a single timer used for request to send and clear to send communications in accordance with various aspects of the present disclosure. The communication scheme 300 may include a RTS/CTS procedure. The RTS/CTS procedure may be initiated based at least in part on an device or entity (e.g., UE 115-a) determining that it has data waiting to be sent to a different device (e.g., base station 105-a). A RTS/CTS procedure may be used as part of a contention-based radio access technology (RAT) (e.g., Wi-Fi) to reduce communication collisions. Such collisions may prevent data from being received by its intended recipient. In some examples, a RTS/CTS procedure may be implemented using a non-contention based RATs such as 3G, LTE, 5G, or others. In the illustrative example of FIG. 3, the UE 115-a is transmitting a RTS message 305 as part of the RTS/CTS procedure. It should be appreciated that the RTS/CTS procedure may be implemented by any number of devices in a wireless communication system (e.g., base station 105-a, UE 115-b).

A wireless communications system 200 that uses directional communication links 205 may use the RTS/CTS procedure to re-establish a communication link that has been unexpectedly terminated. Directional communication links 205 serve a limited geographic area. UEs 115 are able to move through the wireless communications system 200. In some instances, the UEs 115 may move out of the limited geographic area served by a directional communication link 205. In such an event, the directional communication link 205 between the base station 105 and the UE 115 may be severed. The directional communication links 205 may use a particular set of communications resources (e.g., frames, radio frequency spectrum band).

Upon determining that a directional communication link 205 has been terminated prematurely, the UE 115-a may begin using a dedicated set communication resources to re-establish the directional communication link 205. The dedicated set of communication resources may be different than the communication resources used by the directional communication link. In addition, the dedicated set of communication resources may use a RTS/CTS procedure to avoid communication collisions. In some examples, the dedicated set of communication resources are implemented using a different RAT than what is used to implement the communication resources of the directional communication link 205.

It should be appreciated that the RTS/CTS procedure may be implemented in other ways besides a set of dedicated communication resources. For example, a UE 115-*a* may use the RTS/CTS procedure before transmitting data to the base station 105-*a* using the directional communication link 205-1. The RTS/CTS procedure may be implemented in other contexts as well. In this manner, the UE 115-*a* may use the dedicated set of communication of resources and the RTS/CTS procedure to re-establish a directional communication link 205 with the base station 105-*a*.

The RTS/CTS procedure with a single timer may include a RTS message 305, a CTS message 310, and a data message 315. The UE 115-*a* or the UE 115-*b* may perform the RTS/CTS procedure to obtain permission to transmit data.

The RTS message 305 is configured to request communication resources from the base station 105-*a*. The communication resources may define a transmission opportunity for the UE 115-*a*. In a contention-based RAT, a UE 115-*a* contends with other UEs (e.g., UE 115-*b*) to secure transmission opportunities. As soon as a communication resources become available, the UE 115-*a* and any other UEs (e.g., UE 115-*b*) with data to be transmitted may attempt to secure the newly available resources using a RTS message 305. The base station 105 may determine which RTS message 305 will receive the available communication resources.

The RTS message 305 may be broadcast by the UE 115-*a*. As such, the RTS message 305 transmitted by the UE 115-*a* may be received by the base station 105-*a*, the UE 115-*b*, or any other network entities that may be within range of the UE 115-*a*. A purpose of the RTS message 305 may be to request communication resources from the base station 105-*a*. Another purpose of the RTS message 305 may be to communicate information to the other UEs (e.g., UE 115-*b*) about the pending request for communication resources. For example, the RTS message 305 may include timer data 405 that indicates to the other UEs that they should refrain from transmitting for a period of time. As will be discussed in more detail below, when the UE 115-*b* receives the RTS message 305, the UE 115-*b* may set a timer based on the timer data 405 included in the RTS message 305.

The CTS message 310 may be generated by the base station 105-*a* in response to receiving the RTS message 305. The CTS message 310 is configured to assign available resources to the UE that sent the RTS message 305 (e.g., UE 115-*a*). The CTS message 310 may contain a third timer data that instructs other UEs receiving the CTS message to refrain from transmitting until the end of the period of time determined at least in part by the timer data 405. After receiving one or more RTS messages 305, the base station 105-*a* may determine which request may be granted and may generate a CTS message 310 for that granted request.

The CTS message 310 may be intended for the UE that is having its request for communication resources granted (e.g., UE 115-*a*). The base station 105-*a* may broadcast the CTS message 310. As such, the UE 115-*b* additionally or alternatively may receive the CTS message 310. The UE 115-*b* may not be a primary intended recipient for the CTS message 310, the other UE 115-*b* may still use the CTS message 310 to perform some functions. If a third UE 115-*c* (not shown) receives CTS message 310 but does not receive the RTS message 305, the third UE 115-*c* may refrain from transmitting during the transmit opportunity granted to UE 115-*a* using the third timer information and the instruction found in the CTS message 310.

The UE 115-*a* may transmit a data message 315 in response to receiving a CTS message 310. The data message 315 may include the data 415 waiting to be transmitted to the base station 105-*a*. The data message 315 may be transmitted during the transmission opportunity indicated in the CTS message 310. The UE 115-*b* may be capable of receiving the broadcasted data message 315.

Figure 4:
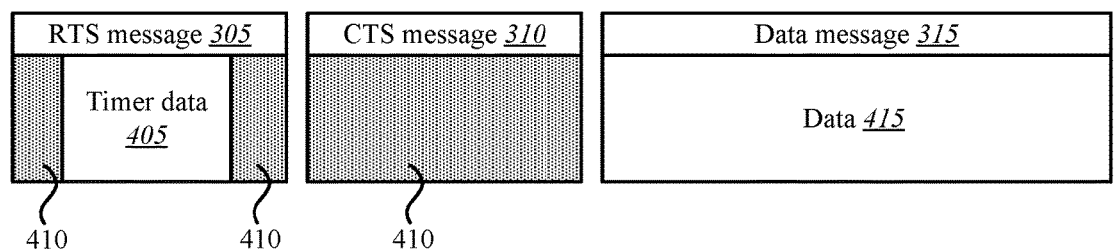
FIG. 4 illustrates an example of a packet structure that supports multiple timers used for request to send and clear to send communications in accordance with various aspects of the present disclosure.

FIG. 4 illustrates an example of a packet structure 400 for messages included in a RTS/CTS procedure with a single timer in accordance with various aspects of the present disclosure. The packet structure 400 includes the packet structure for the RTS message 305, the CTS message 310, and the data message 315.

The RTS message 305 may include timer data 405 and other data 410. The timer data 405 may be configured to indicate a duration of a timer to be initiated by the UE 115-*b* upon receiving a RTS message 305. The RTS message 305 may include a number of bits. Portions of the RTS message 305 may be dedicated to conveying specific types of data. For example, a RTS message 305 may include a frame control portion, a timer data portion, a receiver address portion, a transmitter address portion, a frame check sequence portion, or any combinations thereof. The other data 410 in the RTS message 305 may include any data not associated with a timer.

The timer data 405 may include a network allocation vector (NAV) timer. A NAV timer indicates how long the UE 115-*b* should be silent in response to receiving the RTS message 305 transmitted by the UE 115-*a*. The NAV timer may indicate a duration that extends from the reception of the RTS message 305 by the UE 115-*b* to the conclusion of the data message 315. However, in some instances, the UE 115-*a* that transmits the RTS message 305 may not receive a CTS message 310 from the base station 105-*a* in response. In those instances, the UE 115-*a* will not transmit the data message 315 because the UE 115-*a* was not cleared to transmit the data message 315. Because the NAV timer indicates that the UE 115-*b* should be silent for a duration that concludes with the expected duration of the data message 315, the UE 115-*b* may not attempt to use the communication resources not being used by the UE 115-*a*. As such, available communication resources may go unused leading to an inefficient use of those communication resources.

The CTS message 310 may include a number of bits. Portions of the CTS message 310 may be dedicated to conveying specific types of data. For example, a CTS message 310 may include a frame control portion, a timer data portion, a receiver address portion, a transmitter address portion, a frame check sequence portion, or any combinations thereof. The CTS message 310 may additionally or alternatively include a duration of the transmission opportunity being granted to the UE 115-*a*. The information in the CTS message 310 on the duration of the transmission opportunity being granted to UE 115-*a* may be used by any other UEs to refrain from transmitting during UE 115-*a*'s transmission opportunity.

The data message 315 may include data 415. The data 415 may be intended for a particular recipient (e.g., base station 105-*a*). A duration of the data 415 may vary.

Figure 5:
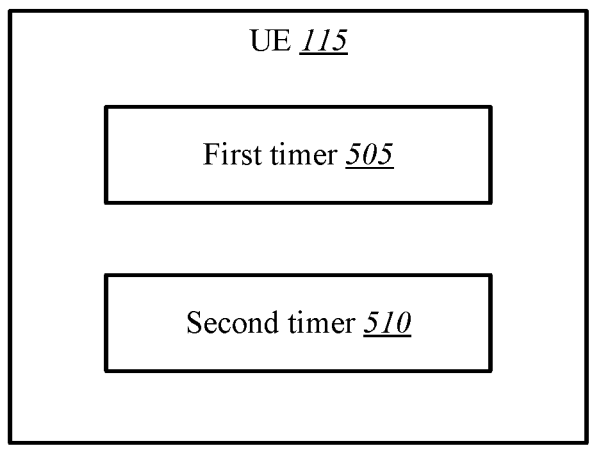
FIG. 5 illustrates an example of a computing environment that supports multiple timers used for request to send and clear to send communications in accordance with various aspects of the present disclosure.

FIG. 5 illustrates an example of a computing environment 500 for multiple timers used for request to send and clear to send communications in accordance with various aspects of the present disclosure. To address potentially inefficient uses of communication resources in a RTS/CTS procedure that has a single timer, a RTS/CTS message using multiple timers is described herein. To implement a multiple timer RTS/CTS procedure, a UE 115 (e.g., UE 115-a or UE 115-b) may include a first timer 505 and a second timer 510. The first timer 505 may be associated with first timer data included in the timer data 705. The second timer 510 may be associated with second timer data included in the timer data 710. Using two timers allows the UE 115-b to attempt to use resources that were not cleared to be used. For example, if the UE 115-a does not receive a CTS message 310-a in response to its RTS message 305-a, the UE 115-b may send its own RTS message requesting to use the newly available resources prior to the expiration of a traditional NAV timer.

Upon receiving the RTS message 305, the UE 115-b may determine durations included in the timer data. Using those durations, the UE 115-b may initiate the first timer 505. The first timer 505 is set to a duration value. The first timer 505 may decrement it's value until it reaches zero. At zero, the UE 115-b may determine that it can send its own RTS message requesting resources. If the UE 115-b receives a different RTS message 305-a prior to the expiration of the previous timer, the UE 115-b may reset its timer based on the duration included in the different RTS message 305-a.

In the multiple timer RTS/CTS procedure discussed herein, the first timer 505 may be based at least in part on a duration associated with the RTS message 305 and the CTS message 310 and the second timer 510 may be based at least in part on a duration associated with the data message 315. In this manner, a UE 115 may be configured to react to changing network conditions and request communication resources in a more efficient manner than using a single timer, such as a NAV timer. In some examples, the UE 115-a may include additional timers (e.g., three timers, four timers, five timers).

Figure 6:
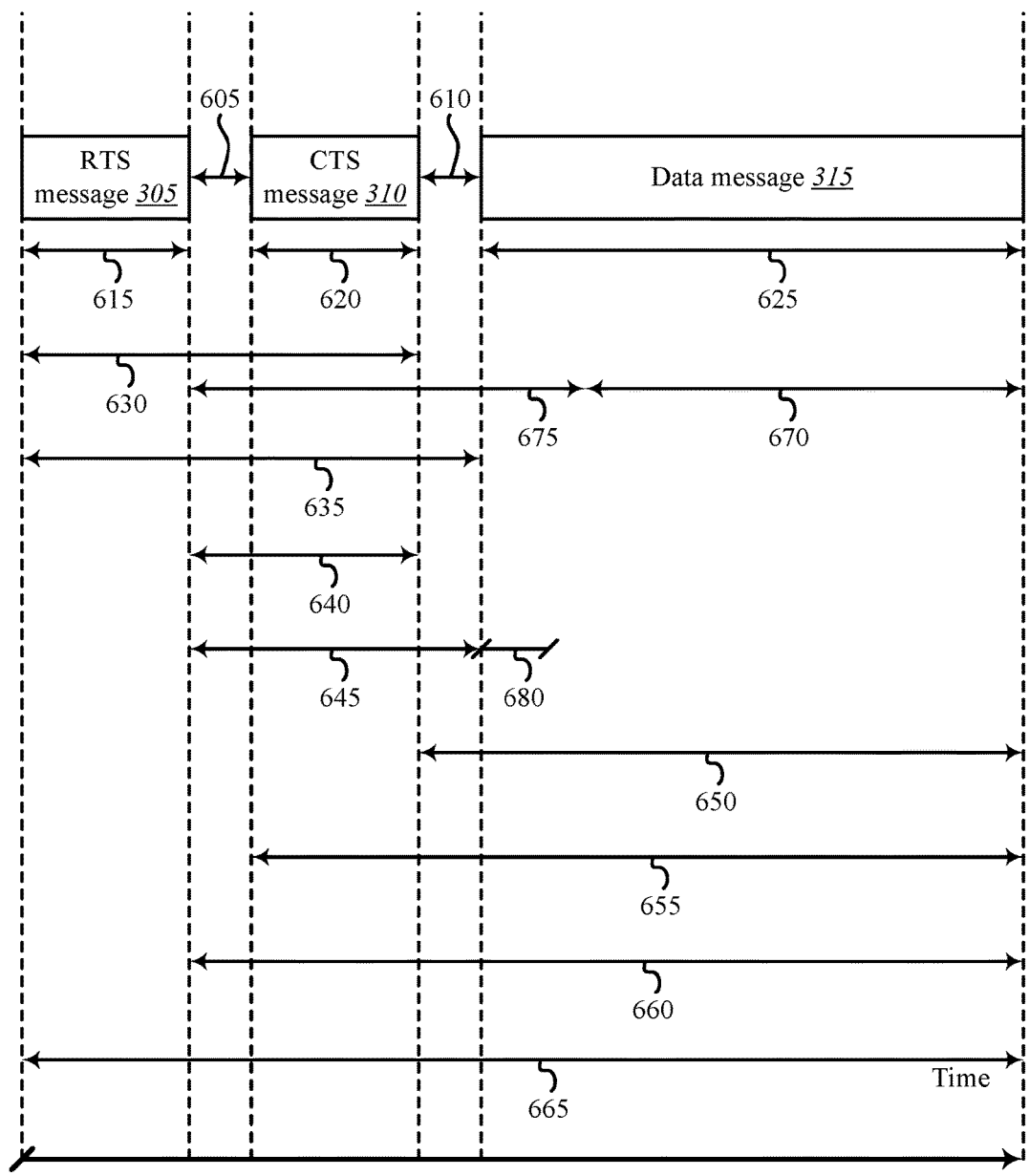
FIG. 6 illustrates an example of a timeline that supports multiple timers used for request to send and clear to send communications in accordance with various aspects of the present disclosure.

FIG. 6 illustrates an example of a communications timeline 600 for multiple timers used for request to send and clear to send communications in accordance with various aspects of the present disclosure. The communications timeline 600 may indicate durations associated with a multiple timer RTS/CTS procedure. The duration described herein may be used to determine timer data associated with the first timer 505 or timer data associated with the second timer 510. As used herein, a duration may refer to a period of time. For example, a duration may refer to a period of time it takes to transmit a message. In another example, a duration may refer to a period of time it takes to perform an operation. In other examples, a duration may refer to a period of time taken between other operations or transmission.

The communications timeline 600 shows that first a RTS message 305 may be transmitted, next a CTS message 310 may be transmitted, and finally a data message 315 may be transmitted. A gap 605 may exist between the conclusion of the RTS message 305 transmission and the beginning of the CTS message 310 transmission. The gap 605 may have a duration. The gap 605 may exist because an entity that receives the RTS message 305 may require time to decode the RTS message 305, make determinations, generate a CTS message 310, or transmit the CTS message 310. A similar gap 610 may exist between the conclusion of the CTS message 310 transmission and the beginning of the data message 315 transmission. The gap 610 may have a duration. The gap 610 may exist because an entity that receives the CTS message 310 may require time to decode the CTS message 310, make determinations, generate a data message 315, or transmit the data message 315.

The RTS message 305 may take a duration 615 to transmit. The duration 615 may extend from the beginning of a RTS message transmission to the conclusion of the RTS message transmission. The CTS message 310 make take a duration 620. The duration 620 may extend from the beginning of a CTS message transmission to the conclusion of the CTS message transmission. The duration 615 may be different than the duration 620. In some examples, the duration 615 is the same as the duration 620. The data message 315 may take a duration 625. The duration 625 may extend from an expected beginning of a data message transmission to an expected conclusion of a data message transmission. The duration 625 of the data message 315 may be based at least in part on a transmission opportunity indicated in the CTS message 310. In some examples, the duration 625 may be based at least in part on a duration associated with the data 415 being transmitted in the data message 315.

Other durations may be defined based at least in part on the RTS/CTS procedure. For example, a duration 630 may be defined between an expected beginning of a RTS message transmission and an expected conclusion of a CTS message transmission. A duration 635 may be extend between an expected beginning of a RTS message transmission to an expected beginning of a data message transmission. A duration 640 may extend from an expected conclusion of a RTS message transmission to an expected conclusion of a CTS message transmission. A duration 645 may extend from an expected conclusion of a RTS message transmission to an expected beginning of a data message transmission. A duration 650 may extend from an expected conclusion of a CTS message transmission to an expected conclusion of a data message transmission. A duration 655 may extend from an expected beginning of a CTS message transmission to an expected conclusion of a data message transmission. A duration 660 may extend from an expected conclusion of a RTS message transmission to an expected conclusion of a data message transmission. A duration 665 may extend from a beginning of a RTS message transmission to a conclusion of a data message transmission. A duration 670 may account for a portion of the data message 315.

In some examples, the duration 670 may be based at least in part on a duration of the data 415 in the data message 315. A duration 675 may extend from an expected conclusion of the RTS message 305 to an expected beginning of the data 415 portion of the data message 315. In some examples, the duration 675 may extend from an expected conclusion of the RTS message 305 to an expected conclusion of a transmission that include the second timer data 710.

Timer data used in the RTS/CTS procedure may be based at least in part on any of the durations described above, on other durations that may be present in a RTS/CTS procedure, or any combinations thereof. Techniques are described herein to use multiple timers as part of a RTS/CTS procedure. In a single RTS/CTS procedure, timer data may be based at least in part on multiple durations.

Durations used by timer data in the RTS/CTS procedure to determine timer data 405 may additionally or alternatively include an error margin 680. For example, timer data 405 may be based at least in part on the duration 640 and an error margin 680. The error margin 680 may refer to a variable duration that is added to a more defined duration associated with the RTS/CTS procedure when used in timer data. In some instances, an actual arrival time of a message may vary from its expected arrival time. The error margin 680 is a duration of time configured to prevent a timer of the UE 115-b (e.g., first timer 505 or second timer 510) from expiring prematurely. In such a situation, the UE 115-b may incorrectly determine that resources are available when, in fact, the UE 115-a may be transmitting the data message 315 based at least in part on a late-arriving CTS message 310. In these instances, the UE 115-*b* may transmit its own RTS message that collides with the data message 315 being transmitted by the UE 115-*a*.

Figure 7:
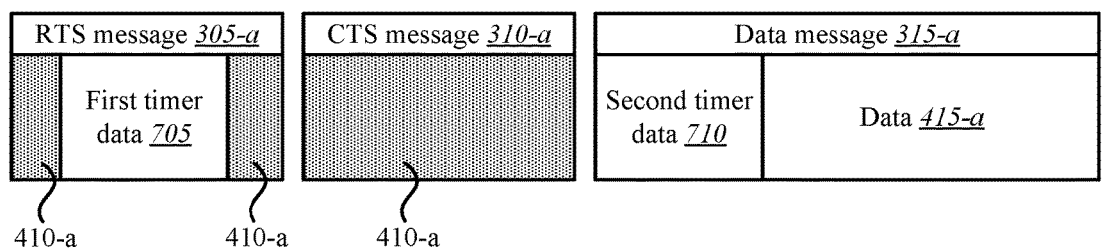
FIG. 7 illustrates an example of a packet structure that supports multiple timers used for request to send and clear to send communications in accordance with various aspects of the present disclosure.

FIG. 7 illustrates an example of a packet structure 700 using multiple timers for request to send and clear to send communications in accordance with various aspects of the present disclosure. The packet structure 700 includes a RTS message 305-*a*, a CTS message 310-*a*, and a data message 315-*a*. The RTS message 305-*a* may be an example of the RTS message 305 described with reference to FIGS. 3-6. The CTS message 310-*a* may be an example of the CTS message 310 described with reference to FIGS. 3-6. The CTS message 310 may contain a third timer data (not shown) determined by the base station 105-*b* that instructs other UEs receiving the CTS message to refrain from transmitting until the expected end of the transmission of the data message 315-*a*. The expected end of the data message 315-*a* transmission is determined by the base station 105-*b* based on the amount of data, the current uplink transmission rate, etc., as conveyed in the other data 410-*a* field of the RTS message 305 from the UE 115-*a*. The data message 315-*a* may be an example of the data message 315 described with reference to FIGS. 3-6.

The RTS message 305-*a* may include other data 410-*a* and first timer data 705. The other data 410-*a* may be an example of other data 410 described with reference to FIG. 4. The first timer data 705 may include a duration associated with the RTS message 305-*a* and the CTS message 310-*a*. In particular, the duration indicated in the first timer data 705 may relate to a duration associated with the RTS message 305-*a* and a duration associated with the CTS message 310-*a*. The duration included in the first timer data 705 may be the duration 640 with or without an error margin 680. The duration 640 may extend from the reception of the RTS message 305-*a* by the UE 115-*b* to an expected conclusion of a CTS message 310. In some examples, if the CTS message 310-*a* is not received, the first timer 505 based on the first timer data 705 may expire as discussed in more detail in FIG. 9.

In some examples, the duration included in the first timer data 705 may be duration 615, duration 620, duration 630, duration 635, duration 645, or duration 675. The duration included in the first timer data 705 may additionally or alternatively include an error margin 680. In other examples, the duration included in the first timer data 705 may be duration 650, 655, 660, 665, or 670 with or without an error margin 680. In other examples, the duration included in the first timer data 705 may be other durations related to a RTS/CTS procedure.

The data message 315-*a* may include data 415-*a* and second timer data 710. The data 415-*a* may be an example of the data 415 described with reference to FIGS. 3 and 4. The second timer data 710 may be based at least in part on the first timer data 705. In this manner the first timer data 705 and the second timer data 710 may cooperate to define a duration of a RTS/CTS procedure. The second timer data 710 may include a duration associated with the data message 315. The second timer data 710 may include a duration associated with the data 415-*a* portion of the data message, such as duration 670. For example, the duration included in the second timer data 710 may be the duration 670 with or without an error margin 680. The duration included in the second timer data 710 may extend from an expected beginning of the data 415-*a* portion of the data message 315-*a* to an expected conclusion of the data 415-*a* portion of the data message 315-*a*.

In some examples, the duration included in the first timer data 705 may be duration 615, duration 620, duration 630, duration 635, duration 640, duration 645, duration 650, duration 655, duration 660, duration 665, or duration 675. The duration included in the second timer data 710 may additionally or alternatively include an error margin 680. In other examples, the duration included in the second timer data 710 may be other durations related to a RTS/CTS procedure.

Figure 8:
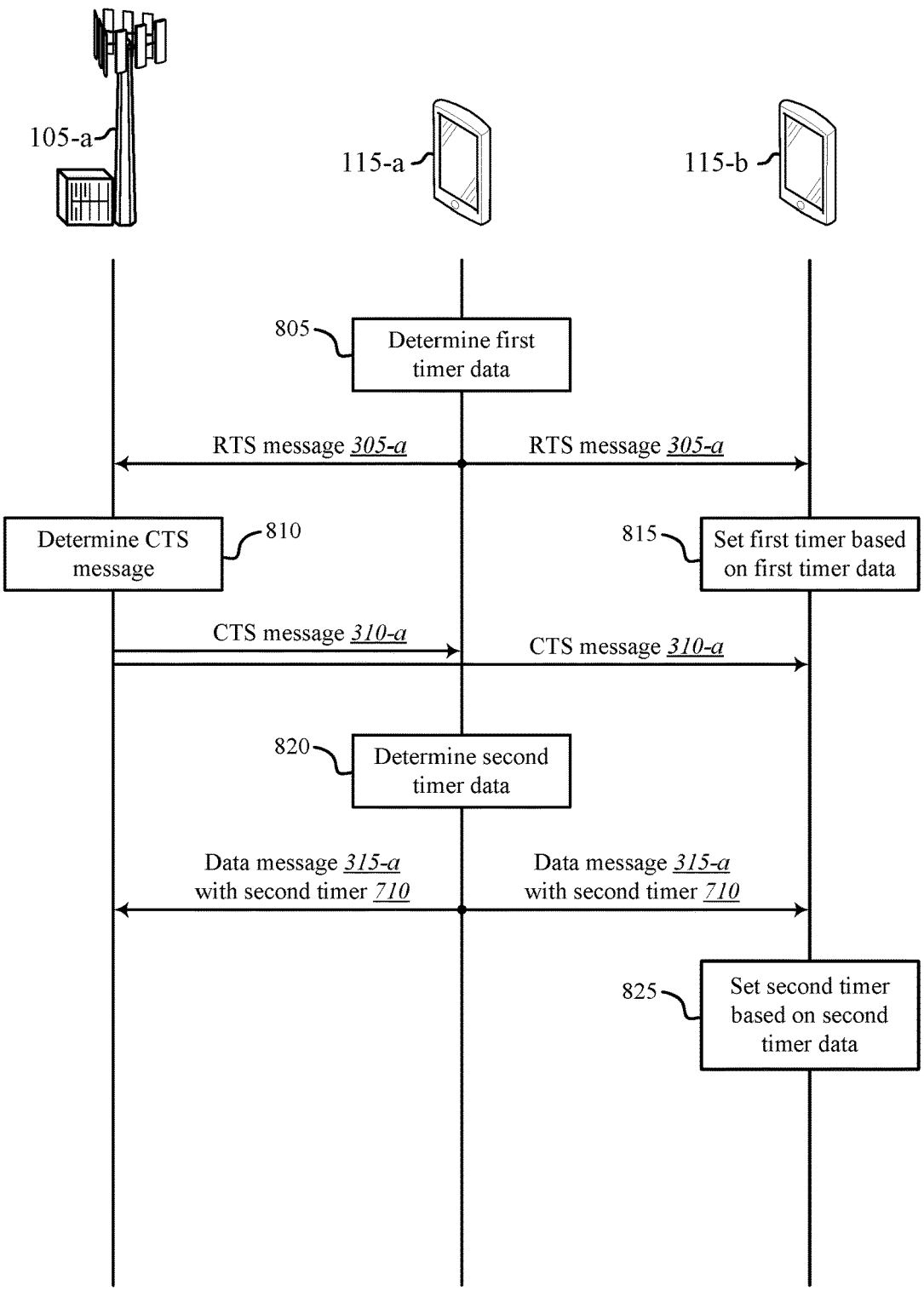
FIG. 8 illustrates an example of a communication scheme that supports multiple timers used for request to send and clear to send communications in accordance with various aspects of the present disclosure.

FIG. 8 illustrates an example of a communication scheme 800 using multiple timers for request to send and clear to send communications in accordance with various aspects of the present disclosure. The communication scheme 800 may be an example of how the packet structures 700 described with relation to FIG. 7 may be communicated during a RTS/CTS procedure.

At block 805, the UE 115-*a* may determine first timer data 705 having a duration. As discussed in the present disclosure, the first timer data 705 may include a duration associated with an expected arrival time of the CTS message 310-*a*. Once the first timer data 705 is determined, the UE 115-*a* may generate the RTS message 305-*a* that includes the first timer data 705. The UE 115-*a* may transmit the RTS message 305-*a* to the base station 105-*a* and the UE 115-*b*. The duration in the first timer data 705 may be determined such that other UEs (e.g., UE 115-*b*) may request to use resources if the UE 115-*a* does not receive a CTS message 310-*a* from the base station 105-*a* prior to the expiration of the first timer 505.

At block 810, the base station 105-*a* may determine whether to send a CTS message 310-*a* in response to receiving the RTS message 305-*a*. The base station 105-*a* may receive multiple RTS messages at a timer. The base station 105-*a* may generate the CTS message 310-*a* based at least in part on information included in the RTS message 305-*a*. In some examples, the base station 105-*a* may determine a duration included in the first timer data 705. The base station 105-*a* may transmit a CTS message before the duration in the first timer data 705 expires. In some examples, the CTS message 310-*a* may include data indicating a duration of the transmission opportunity allocated to be used by the UE 115-*a*.

At block 815, the UE 115-*b* may receive the RTS message 305-*a*. Upon receiving the RTS message 305-*a*, the UE 115-*b* may initiate a first timer 505 based at least in part on the duration included in the first timer data 705 of the RTS message 305-*a*. The first timer 505 may decrement until it reaches zero. If the UE 115-*b* receives the CTS message 310-*a* or receives a different type of indication that the UE 115-*a* has received the CTS message 310-*a*, the UE 115-*b* may terminate its first timer 505. In some examples, the first timer continues decrementing regardless of whether a CTS message 310-*a* is received. The first timer 505 may be based at least in part on the first timer data 705 and reception of the RTS message 305-*a*.

If the UE 115-*a* receives the CTS message 310-*a* from the base station 105-*a*, the UE 115-*a*, at block 820, may determine second timer data 710. The second timer data 710 may include a duration associated with a duration of the transmission opportunity. In some examples, the second timer data 710 may include a duration associated with the data message 315-*a* or a data 415-*a* portion of the data message 315-*a*. In some examples, the UE 115-*a* may determine the second timer data 710 prior to receiving the CTS message 310-*a*. For example, the second timer data 710 may be determined along with the first timer data 705 at block 805.

The UE 115-a may generate a data message 315-a that includes the second timer data 710 and the data 415-a. The UE 115-a may transmit the data message 315-a with the second timer data 710 to the base station 105-a and the UE 115-b. In some examples, the second timer data 710 is transmitted and a CTS message is not transmitted in response to the second timer data 710.

Upon receiving the data message 315-a, at block 825, the UE 115-b may set a second timer 510 based at least in part on the duration included in the second timer data 710 in the data message 315-a. In some examples, upon initiating the second timer 510, the UE 115-b may ignore or terminate the first timer 505. In some examples, the second timer data 710 may be received by the UE 115-b prior to the expiration of the first timer 505 based at least in part on the first timer data 705. The second timer 510 may be based at least in part on the second timer data 710 and reception of the CTS message 310-a prior to the expiration of the first timer 505. The second timer 510 may be based at least in part on the second timer data 710 and reception of the second timer data 710 prior to the expiration of the first timer 505.

Figure 9:
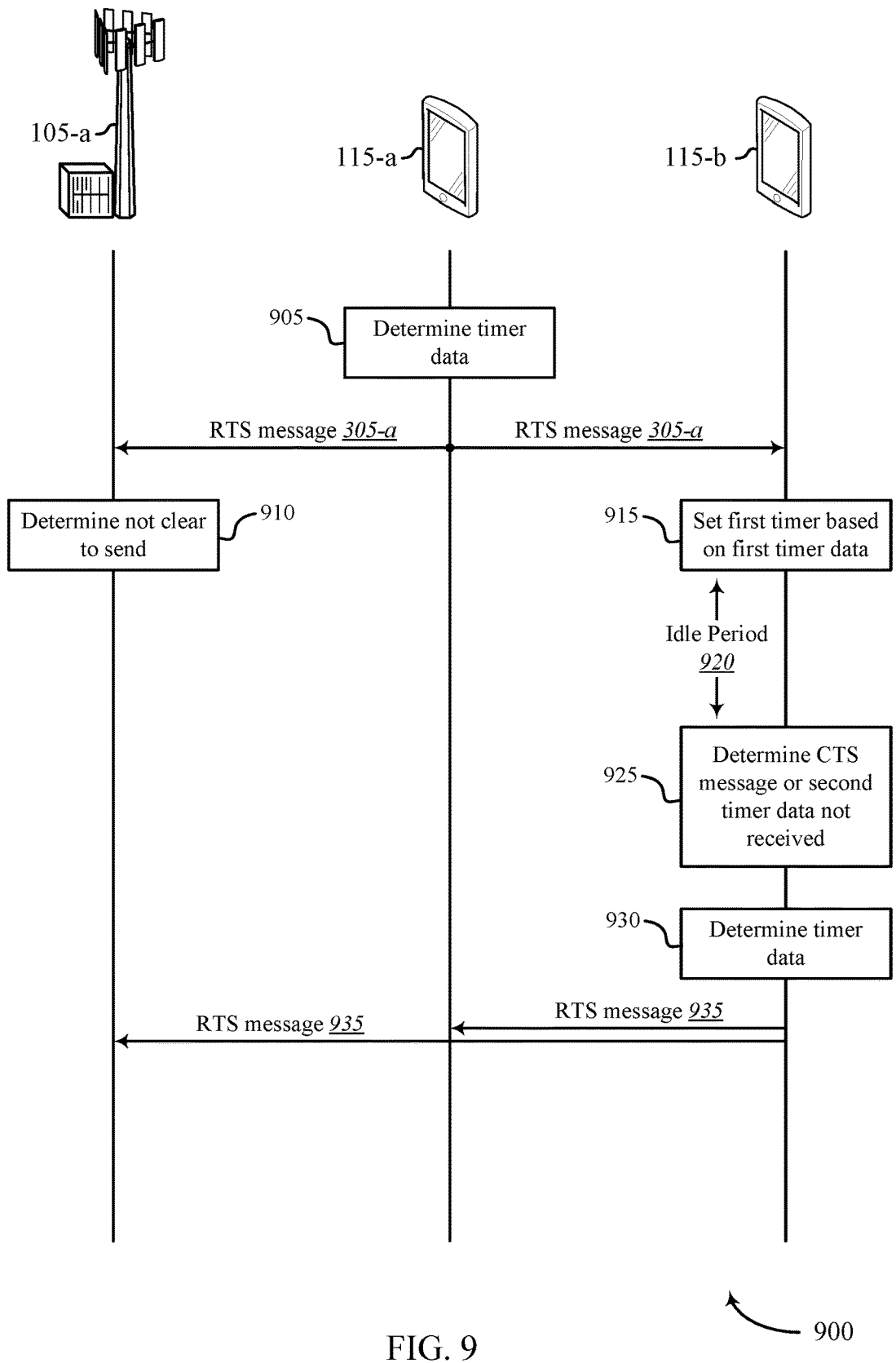
FIG. 9 illustrates an example of a communication scheme that supports multiple timers used for request to send and clear to send communications in accordance with various aspects of the present disclosure.

FIG. 9 illustrates an example of a communication scheme 900 used for multiple timers for request to send and clear to send communications in accordance with various aspects of the present disclosure. The communication scheme 900 may indicate operations and procedures that occur in a RTS/CTS procedure when the UE 115-b determines that resources have become available after the expiration of the first timer.

At block 905, the UE 115-a may determine timer data, such as the first timer data 705 and the second timer data 710. Block 905 may be an example of blocks 805 and 820 described with reference to FIG. 8.

At block 910, the base station 105-a may determine that the UE 115-a is not clear to send its data 415-a. As such, the base station 105-a may not transmit the CTS message 310-a. In some examples, the base station 105-a may simply ignore the RTS message 305-a upon determining to not fulfill the request.

At block 915, the UE 115-b may set a first timer 505 based at least in part on the duration included in the first timer data 705 in the RTS message 305-a. Block 915 may be an example of block 815 described with reference to FIG. 8.

The UE 115-b may wait for an idle period 920 to determine whether UE 115-a is going to be permitted to send its data 415-a. The idle period 920 may be based at least in part on the first timer 505 and the duration included in the first timer data 705. The idle period 920 may be less than an idle period associated with a legacy NAV timer. The idle period 920 may be less than an idle period associated with RTS/CTS procedures that use a single timer.

At block 925, the UE 115-b may determine that the UE 115-a did not receive permission to use the requested communication resources. The UE 115-b may make this determination based at least in part on not receiving the CTS message 310-a prior to the expiration of the first timer 505. The UE 115-b may make this determination based at least in part on not receiving the second timer data 710 prior to the expiration of the first timer 505. The UE 115-b may make this determination based at least in part on receiving a separate indication from the base station 105-a that no CTS message 310-a is forthcoming. As part of this determination, the UE 115-b may determine that the communication resources once requested to be used by the UE 115-a are now available to be requested by other devices or entities.

At block 930, the UE 115-b may determine timer data associated with its own RTS message to be sent to the base station 105-a. The determination of timer data may be similar to the determinations of timer data described in blocks 805, 820 with reference to FIG. 8. The UE 115-b may transmit a RTS message 935 that includes first timer data to the base station 105-a and the UE 115-a. The RTS message 935 may be an example of RTS message 305-a.

Figure 10:
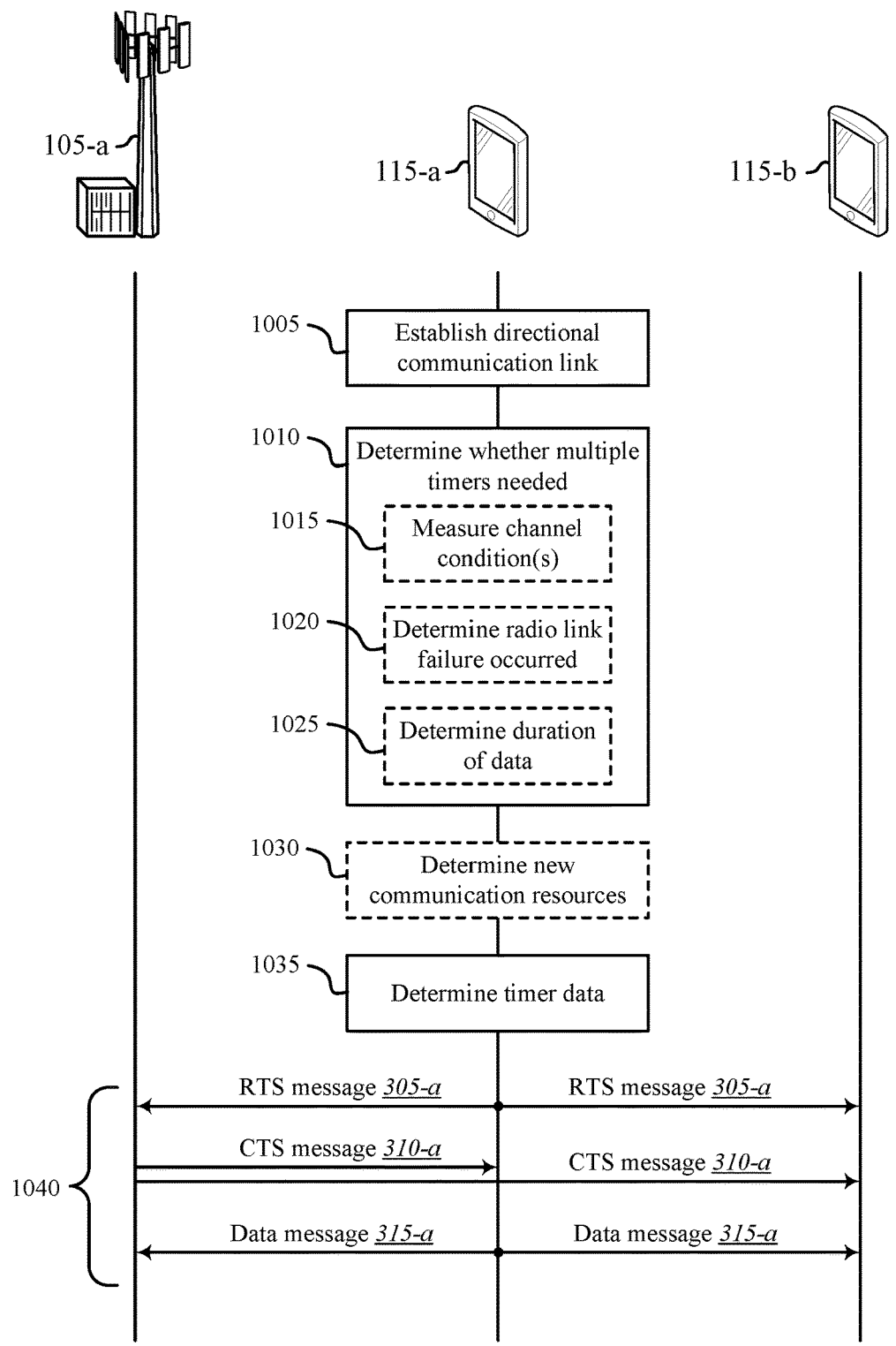
FIG. 10 illustrates an example of a communication scheme that supports multiple timers used for request to send and clear to send communications in accordance with various aspects of the present disclosure.

FIG. 10 illustrates an example of a communication scheme 1000 used for multiple timers for request to send and clear to send communications in accordance with various aspects of the present disclosure. The communication scheme 1000 may indicate operations and procedures that occur in a RTS/CTS procedure to determine whether to initiate a multiple timer RTS/CTS procedure or whether to initiate a single timer RTS/CTS procedure. As part of these operations and procedures, it may additionally or alternatively be determined how many timers to use as part of a RTS/CTS procedure.

At block 1005, the UE 115-a and the base station 105-a may cooperate to establish directional communication links, such as a directional communication link 205. The directional communication link may be established using a first set of communication resources (e.g., radio frequency spectrum band resources). The directional communication link may be established using a first RAT. The first RAT may include a cellular RAT (e.g., 3G, LTE, 4G) or a Wi-Fi RAT (e.g., IEEE 802.11ad).

The directional communication links may include a downlink directional link, an uplink directional link, or any combination thereof. As part of establishing directional communication links, the base station 105-a may determine a location of the UE 115-a. In some examples, base stations 105 are for example, fixed in a given location while UEs 115 may move throughout the wireless communication system. To align directional beams, the base station 105-a may determine a location of the UE 115-a. The location of the UE 115-a may be determined based at least in part on location data generated by the UE 115-a, by a searching/alignment algorithm executed by the base station 105-a and/or the UE 115-a, other types of directional link establishment techniques, or any combination thereof. As part of establishing a directional link, the base station 105-a and the UE 115-a may execute a handshake procedure. In some examples, the establishment of a directional link may be based at least in part on a relative location of the UE 115-a to the base station 105-a.

In some examples, keepalive messages may be exchanged between the base station 105-a and the UE 115-a. A keepalive message may refer to a message sent by one device to another device to check that the communication link between the two devices is operating. The base station 105-a may determine whether a keepalive message has been received from the UE 115-a within a time threshold. If a keepalive message has not been received, the base station 105-a may not generate a CTS message 310-a and may not grant the requested communication resources to the UE 115-a. The keepalive messages may be associated with the directional communication links. A determination about the use of multiple timers may be based at least in part on whether keepalive messages have been received. In some examples, if keepalive messages have not been received, a RTS/CTS procedure (e.g., a procedure including or based on using a RTS/CTS) using multiple timers may be used to ensure communication resources are preserved for other devices that have established links with the base station.

At block 1010, the UE 115-a may determine whether to implement a RTS/CTS procedure using multiple timers. As part of that determination, the UE 115-a may identify data waiting to be sent to another entity (e.g., the base station 105-*a*). In general, entities perform RTS/CTS procedures after determining that the entity needs to transmit data to another entity. The identified data may be generated by the UE 115-*a*. The determination of whether to implement a RTS/CTS procedure using multiple timers may include measuring channel condition(s) associated with the directional communication link, determining whether a radio link failure (RLF) associated with the directional communication link has occurred, determining a duration of the data to be sent (e.g., duration 625), or any combinations thereof.

At block 1015, the UE 115-*a* may measure at least one channel condition associated with the directional communication links already established between the UE 115-*a* and the base station 105-*a* (e.g., directional communication link 205). The channel conditions that the UE 115-*a* may measure may include received signal strength, calibration error between elements of a phase array antenna, misalignment of a directional communication link, lack of reciprocity between downlink directional communication links and uplink directional communication links, network traffic, network congestion, signal-to-noise ratio, signal-to-interference-to-noise ratio, reference signal strength indicator (RSSI), reference signal received power (RSRP), reference signal received quality (RSRQ), other types of channel conditions, or any combinations thereof.

Based at least in part on whether some channel conditions exist, the UE 115-*a* may determine whether to initiate a RTS/CTS procedure that includes multiple timers. For example, if the measured channel conditions indicate there is heavy network traffic, the UE 115-*a* may initiate a RTS/CTS procedure that uses multiple timers. In addition, the UE 115-*a* may additionally or alternatively use the measured channel conditions to determine whether a RTS/CTS procedure is needed at all. For example, if the signal strength of an established directional communication link is below a threshold, the UE 115-*a* may determine that it should modify parameters of the communication link (e.g., direction or width). As part of modifying the communication link, the UE 115-*a* may perform a RTS/CTS procedure to determine whether the UE 115-*a* may request modifications to the established directional communication link. Other channel conditions may also be used to trigger a RTS/CTS procedure using multiple timers.

At block 1020, the UE 115-*a* may determine that the established directional communication link has hit RLF. Upon determining that a directional communication link 205 has experienced an RLF event, the UE 115-*a* may begin using a dedicated set communication resources to re-establish the directional communication link 205. The dedicated set of communication resources may be different than the communication resources used by the directional communication link 205. In addition, the dedicated set of communication resources may use the RTS/CTS procedure to avoid communication collisions. In some examples, the dedicated set of communication resources are implemented using a different RAT than what is used to implement the communication resources of the directional communication link 205. In some examples, identifying that an RLF event occurred may additionally or alternatively cause the UE 115-*a* to determine that multiple timers should be used in the RTS/CTS procedure.

At block 1025, the UE 115-*a* may identify a duration of the data 415-*a* waiting to be transmitted by the UE 115-*a*. The duration of the data 415-*a* waiting to be transmitted may be compared to a duration threshold. If the duration of the data 415-*a* satisfies the threshold, the UE 115-*a* may determine that the RTS/CTS procedure should include at least two timers. In some examples, the UE 115-*a* may identify a size of the data 415-*a* waiting to be transmitted by the UE 115-*a*. The size of the data may be an actual size of the data, an expected size of the data, a calculated size, or any combinations thereof. In some examples, the size of the data may be expressed in bits, bytes, a duration of time to transmit, a number of frames, sub-frames, or slots, or any combinations thereof.

The effects of unused communication resources due to over-lengthy timers may be made more pronounced by larger data transmission. For example, if the duration of the data 415-*a* is short, not many resources may be lost using a legacy NAV timer. However, if the duration of the data 415-*a* is long, a large amount of communication resources may go unused if the UE 115-*a* does not receive permission use the requested resources. As such, the UE 115-*a* may determine how many timers to use based at least in part on the duration of the data 415-*a* waiting to be transmitted. In some examples, if the duration of the data 415-*a* does not satisfy the duration threshold, one timer may be used in the RTS/CTS procedure. In other examples, there may be multiple thresholds and the number of timers used in the RTS/CTS procedure may be based at least in part on the which thresholds are satisfied. For example, if a first threshold is satisfied but not a second threshold, the UE 115-*a* may determine that the RTS/CTS procedure should include two timers. If the first and second thresholds are satisfied but not a third threshold, the UE 115-*a* may determine that the RTS/CTS procedure should include three timers, etc. In some examples, if the first threshold is not satisfied, the UE 115-*a* may determine that the RTS/CTS procedure should include one timer. The durations included in the timer data may be based at least in part on the number of timers used in the RTS/CTS procedure. For example, the durations used in a two timer RTS/CTS procedure may be different than a duration used in a single timer RTS/CTS procedure, and the durations used in a three timer RTS/CTS procedure may be different than the durations used in the two timer RTS/CTS procedure, etc.

At block 1030, the UE 115-*a* may determine new communication resources to use to execute a RTS/CTS procedure. The UE 115-*a* may communicate via an established directional communication link using a first set of communication resources. If the established directional communication link is terminated prematurely for any reason, the UE 115-*a* may need to identify a second set of communication resources to use to communicate with the base station 105-*a*. The second set of communication resources may be different than the first set of communication resources. The second set of communication resources may use a different RAT than the first set of communication resources. For example, the directional communication links may use a cellular RAT and the RTS/CTS procedure may use a Wi-Fi RAT.

At block 1035, the UE 115-*a* may determine timer data associated with multiple timers to be used in a RTS/CTS procedure. Timer data may be determined for any number of timers determined to be part of the multiple timer RTS/CTS procedure. Block 1035 may be an example of blocks 805, 820 described with reference to FIG. 8.

Communications group 1040 may represent any RTS/CTS procedure described in this disclosure. The transmissions of the RTS message 305-*a*, the CTS message 310-*a*, and the data message 315-*a* are shown for illustrative purposes only. Other transmissions, determinations, procedures, operations, and protocols may be included in the communications group 1040.

Figure 11:
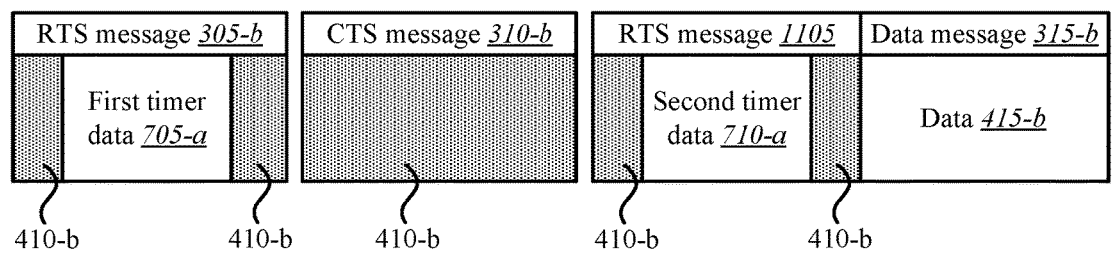
FIG. 11 illustrates an example of a packet structure that supports multiple timers used for request to send and clear to send communications in accordance with various aspects of the present disclosure.

FIG. 11 illustrates an example of a packet structure 1100 used for multiple timers for request to send and clear to send communications in accordance with various aspects of the present disclosure. The packet structure 1100 illustrates another example of how a RTS/CTS procedure using multiple timers may be implemented. The packet structure 1100 includes a RTS message 305-b, a CTS message 310-b, a second RTS message 1105, and a data message 315-b. A difference between the packet structure 1100 and the packet structure 700 described with reference to FIG. 7 may be that the second timer data 710-a may be included in the second RTS message 1105. The CTS message 310-b may contain a third timer data (not shown) determined by the base station 105-b that instructs other UEs receiving the CTS message 310-b to refrain from transmitting until the expected end of the transmission of the data message 315-b. The expected end of the data message 315-b transmission is determined by the base station 105-b based on the amount of data, the current uplink transmission rate, etc., as conveyed in the other data 410-b field in RTS message 305-b from the UE 115-a.

The second RTS message 1105 may be transmitted based at least in part on receiving the CTS message 310-b from the base station 105-b. The second RTS message 1105 may be an example of the RTS messages 305 described with reference to FIGS. 3-10. The data message 315-b may be transmitted prior to receiving a second CTS message in response to the second RTS message 1105. The duration of the first timer data 705-a may be based at least in part on an expected arrival time of the second RTS message 1105. In some examples, the first timer data 705-a may include the duration 675 with or without an error margin 680.

The second RTS message 1105 may be a modified version of the other RTS messages 305 described herein. The second RTS message 1105 may be modified to indicate that no CTS message is required in response. The second RTS message 1105 may be modified to cooperate with the data message 315-b during transmission. In this manner, the second RTS message 1105 and the data message 315-b may be a continuous transmission without transmission gap.

The RTS message 305-b may be an example of the RTS message 305 described with reference to FIGS. 3-10. The CTS message 310-b may be an example of the CTS message 310 described with reference to FIGS. 3-10. The data message 315-b may be an example of the data message 315 described with reference to FIGS. 3-10. The other data 410-b may be an example of other data 410 described with reference to FIG. 4. The data 415-b may be an example of data 415 described with reference to FIG. 4. The first timer data 705-a may be an example of the first timer data 705 described with reference to FIGS. 7-10. The second timer data 710-a may be an example of the second timer data 710 described with reference to FIGS. 7-10.

Figure 12:
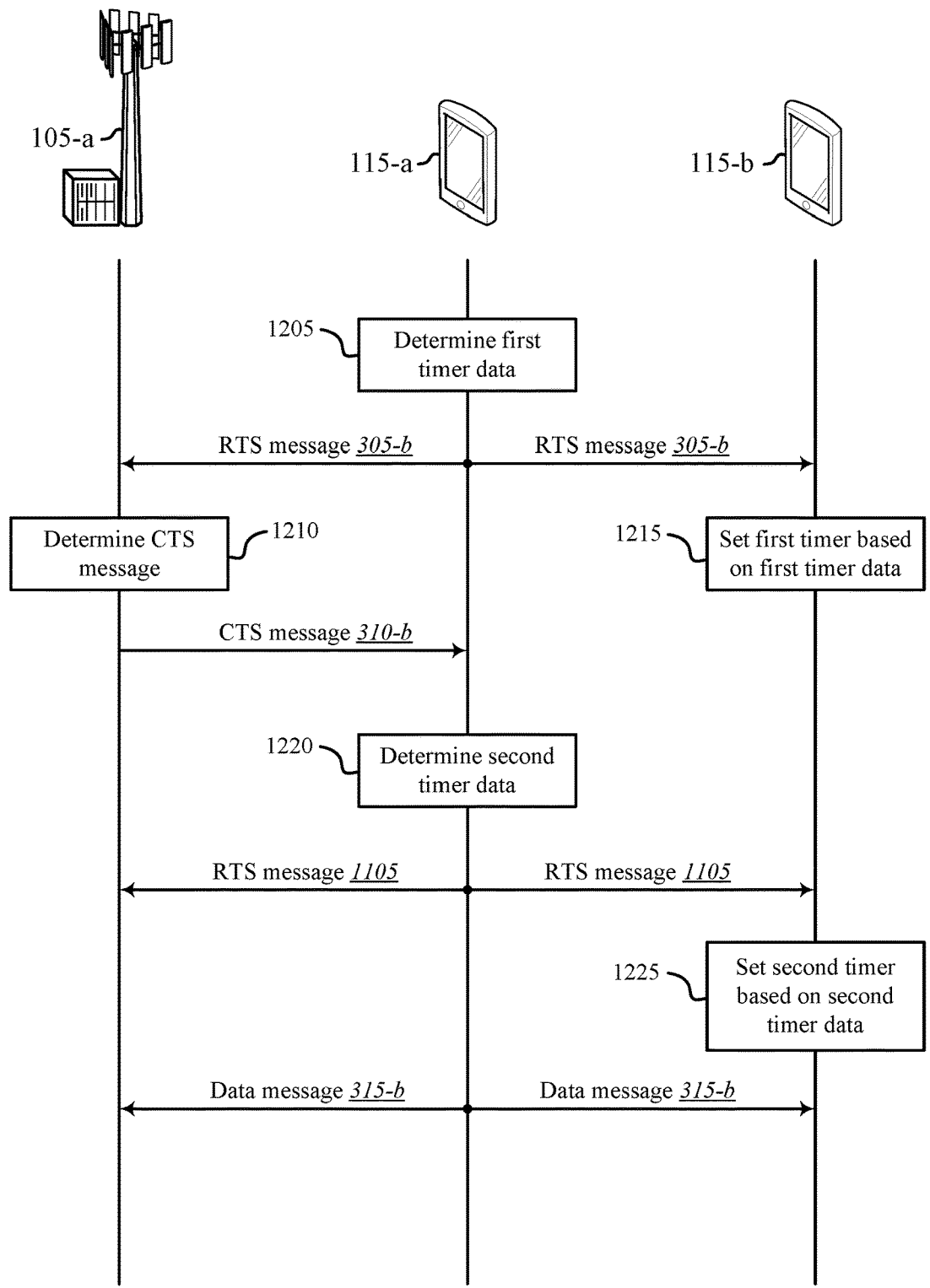
FIG. 12 illustrates an example of a communication scheme that supports multiple timers used for request to send and clear to send communications in accordance with various aspects of the present disclosure.

FIG. 12 illustrates an example of a communication scheme 1200 used for multiple timers for request to send and clear to send communications in accordance with various aspects of the present disclosure. The communication scheme 1200 is associated with the packet structure 1100 described with reference to FIG. 11. Many of the same features of communication scheme 1200 have been described in connection with communication schemes 800, 900, 1000 found in FIGS. 8-10. As such, transmission, operations, and features having similar names and similar numbers are not described in detail here.

After receiving the CTS message 310-b, at block 1220, the UE 115-a may determine the second timer data and generate a second RTS message 1105. The second RTS message 1105 may be transmitted to the base station 105-a and the UE 115-b. Block 1220 may be an example of block 820 described with reference to FIG. 8.

Upon receiving the second RTS message 1105, at block 1225, the UE 115-b may set a second timer based on a duration include in the second timer data 710-a. Block 1225 may be an example of block 825 described with reference to FIG. 8. The data message 315-b may be transmitted by the UE 115-a to the base station 105-a.

Figure 13:
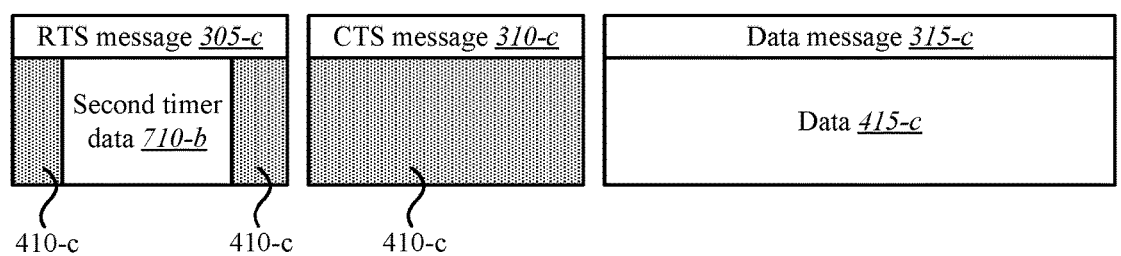
FIG. 13 illustrates an example of a packet structure that supports multiple timers used for request to send and clear to send communications in accordance with various aspects of the present disclosure.

FIG. 13 illustrates an example of a packet structure 1300 used for multiple timers for request to send and clear to send communications in accordance with various aspects of the present disclosure. The packet structure 1300 illustrates another example of how a RTS/CTS procedure using multiple timers may be implemented. The packet structure 1300 includes a RTS message 305-c, a CTS message 310-c, and a data message 315-c.

The packet structure 1300 may rely on a predetermined duration stored on the UE 115-b to initiate the first timer 505. As such, the RTS message 305-c may include second timer data 710-b rather than first timer data 705.

The RTS message 305-c may be an example of the RTS message 305 described with reference to FIGS. 3-10. The CTS message 310-c may be an example of the CTS message 310 described with reference to FIGS. 3-10. The data message 315-c may be an example of the data message 315 described with reference to FIGS. 3-10. The other data 410-c may be an example of other data 410 described with reference to FIG. 4. The data 415-c may be an example of data 415 described with reference to FIG. 4. The second timer data 710-b may be an example of the second timer data 710 described with reference to FIGS. 7-10. The CTS message 310-c may contain a third timer data determined by the base station 105-b that instructs other UEs receiving the CTS message 310-c to refrain from transmitting until the expected end of the transmission of the data message 315-c. The expected end of the data message 315-c transmission is determined by the base station 105-b based on the amount of data, the current uplink transmission rate, etc., as conveyed in the other data 410-c field in RTS message 305-c from the UE 115-a.

Figure 14:
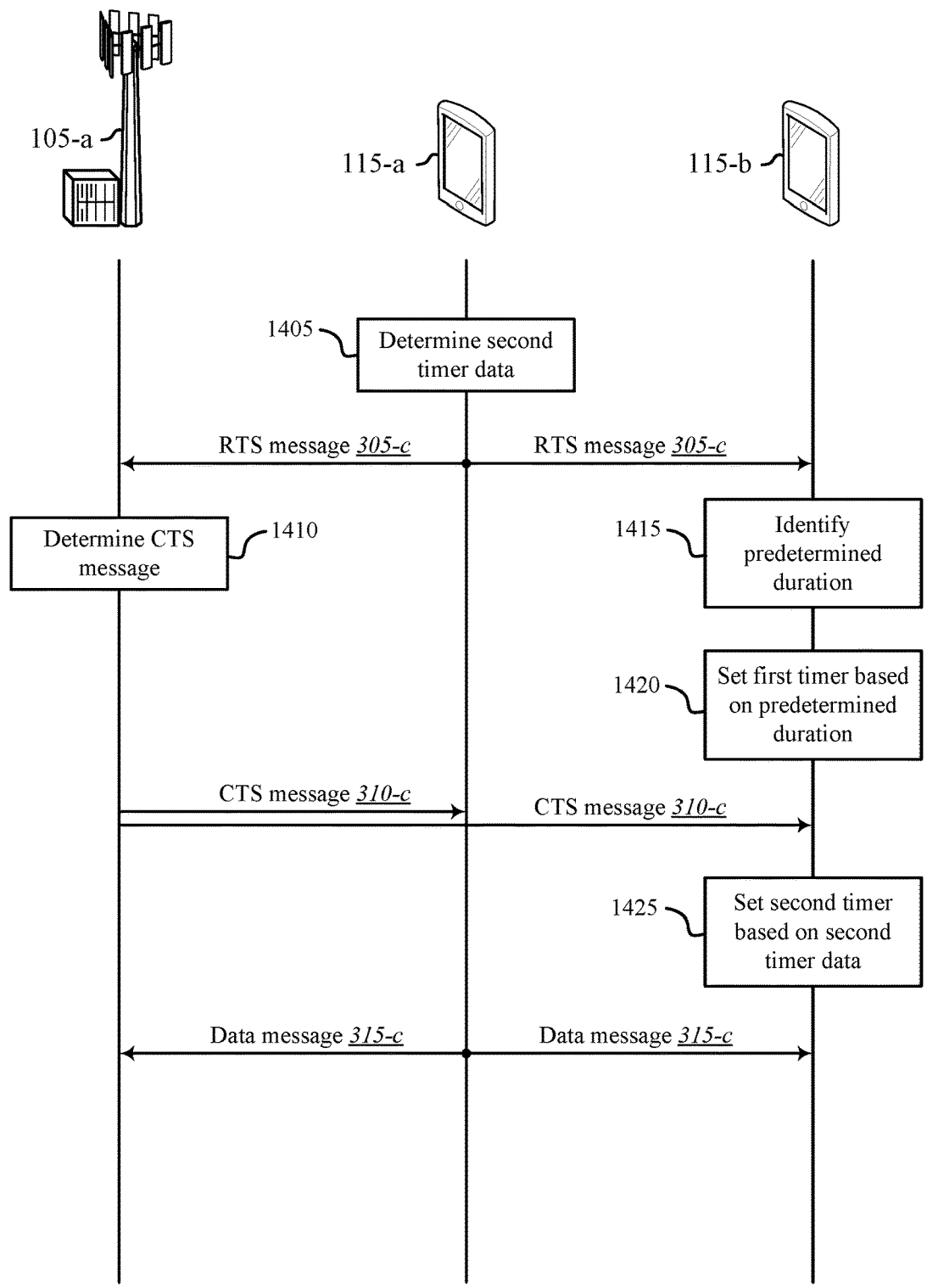
FIG. 14 illustrates an example of a communication scheme that supports multiple timers used for request to send and clear to send communications in accordance with various aspects of the present disclosure.

FIG. 14 illustrates an example of a communication scheme 1400 used for multiple timers for request to send and clear to send communications in accordance with various aspects of the present disclosure. The communication scheme 1400 is associated with the packet structure 1300 described with reference to FIG. 13. Many of the same features of communication scheme 1400 have been described in connection with communication schemes 800, 900, 1000 found in FIGS. 8-10. As such, transmission, operations, and features having similar names and similar numbers are not described in detail here.

Upon receiving the RTS message 305-c that includes second timer data 710-b, at block 1415, the UE 115-b may identify a predetermined duration. The predetermined duration may be stored in a memory of the UE 115-b. Because the durations and lengths of the RTS messages 305 and the CTS messages 310 is relatively fixed, it may not be needed to indicate the duration associated with the first timer 505 in RTS messages 305. As such, the RTS message 305-c may include the second timer data 710-b having a duration related to a duration of the data 415-c in the data message 315-c.

At block 1420, the UE 115-b may set the first timer 505 based at least in part on the predetermined duration and receiving the RTS message 305-c having the second timer data 710-b. In some examples, the RTS message 305-c may include an indication that the its timer data is second timer data 710-*b* and not some other timer data (e.g., a legacy NAV timer or first timer data 705).

Figure 15:
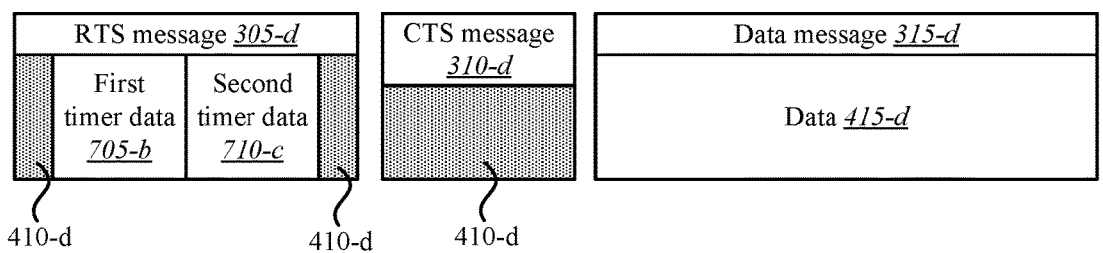
FIG. 15 illustrates an example of a packet structure that supports multiple timers used for request to send and clear to send communications in accordance with various aspects of the present disclosure.

FIG. 15 illustrates an example of a packet structure 1500 used for multiple timers for request to send and clear to send communications in accordance with various aspects of the present disclosure. The packet structure 1500 illustrates another example of how a RTS/CTS procedure using multiple timers may be implemented. The packet structure 1500 includes a RTS message 305-*d*, a CTS message 310-*d*, and a data message 315-*d*.

The packet structure 1500 uses a RTS message 305-*d* that includes both the first timer data 705-*b* and the second timer data 710-*c*. As such, the RTS message 305-*d* may be modified to include both timer data and may be modified to indicate that the RTS message 305-*d* includes data for multiple timers.

The RTS message 305-*d* may be an example of the RTS message 305 described with reference to FIGS. 3-10. The CTS message 310-*d* may be an example of the CTS message 310 described with reference to FIGS. 3-10. The data message 315-*d* may be an example of the data message 315 described with reference to FIGS. 3-10. The other data 410-*d* may be an example of other data 410 described with reference to FIG. 4. The data 415-*d* may be an example of data 415 described with reference to FIG. 4. The first timer data 705-*b* may be an example of the first timer data 705 described with reference to FIGS. 7-10. The second timer data 710-*c* may be an example of the second timer data 710 described with reference to FIGS. 7-10. The CTS message 310-*d* may contain a third timer data determined by the base station 105-*b* that instructs other UEs receiving the CTS message 310-*d* to refrain from transmitting until the expected end of the transmission of the data message 315-*d*. The expected end of the data message 315-*d* transmission is determined by the base station 105-*b* based on the amount of data, the current uplink transmission rate, etc., as conveyed in the other data 410-*d* field in RTS message 305-*d* from the UE 115-*a*.

Figure 16:
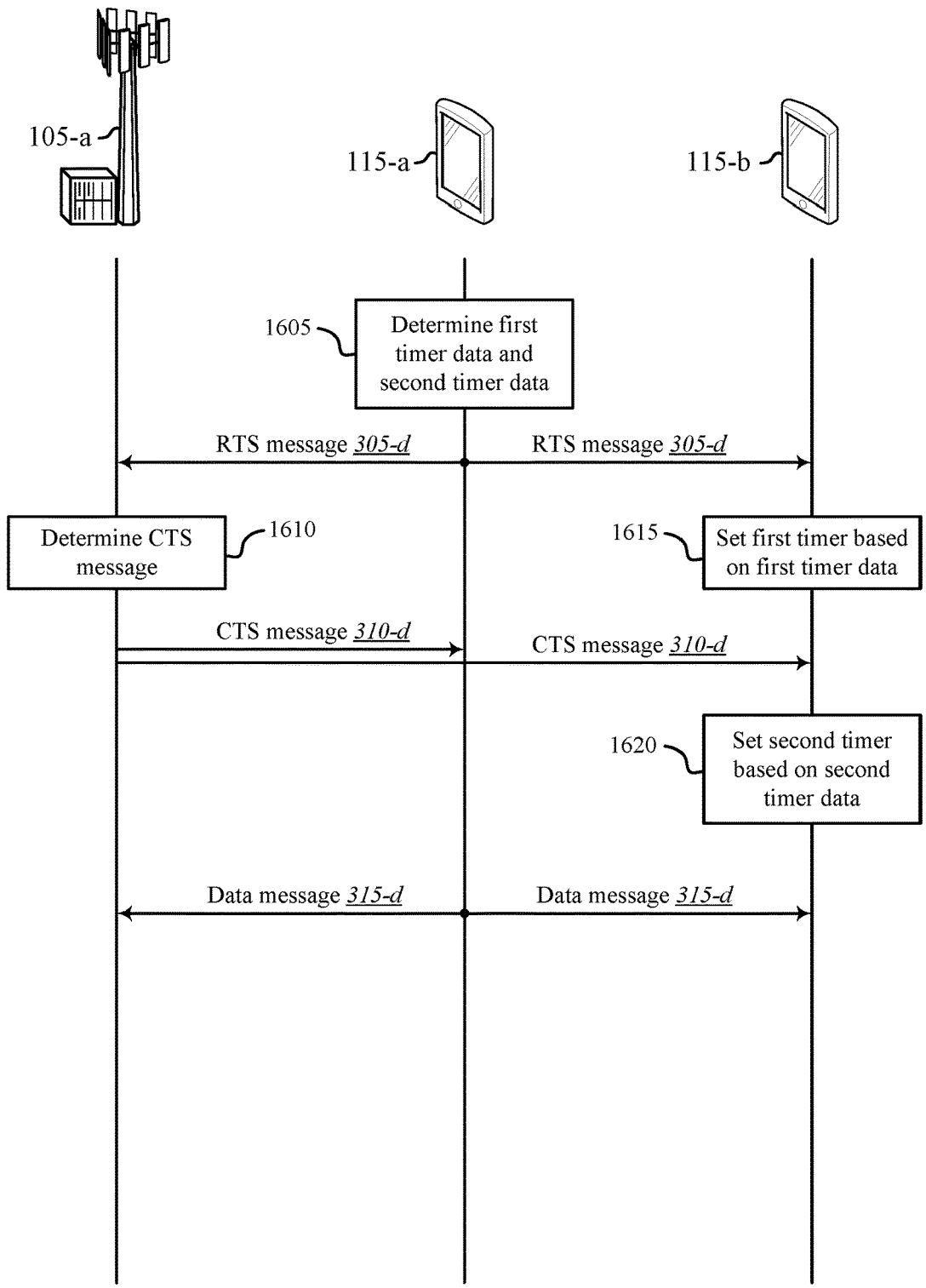
FIG. 16 illustrates an example of a communication scheme that supports multiple timers used for request to send and clear to send communications in accordance with various aspects of the present disclosure.

FIG. 16 illustrates an example of a communication scheme 1600 used for multiple timers for request to send and clear to send communications in accordance with various aspects of the present disclosure. The communication scheme 1600 is associated with the packet structure 1500 described with reference to FIG. 15. Many of the same features of communication scheme 1600 have been described in connection with communication schemes 800, 900, 1000 found in FIGS. 8-10. As such, transmission, operations, and features having similar names and similar numbers are not described in detail here.

At block 1615, the UE 115-*b* may set a first timer 505 based at least in part on first timer data 705-*b* included in the RTS message 305-*d* and reception of the RTS message 305-*d*. In addition, at block 1620, the UE 115-*b* may set a second timer 510 based at least in part on second timer data 710-*c* included in the RTS message 305-*d* and reception of the CTS message 310-*d* prior to the expiration of the first timer 505.

Figure 17:
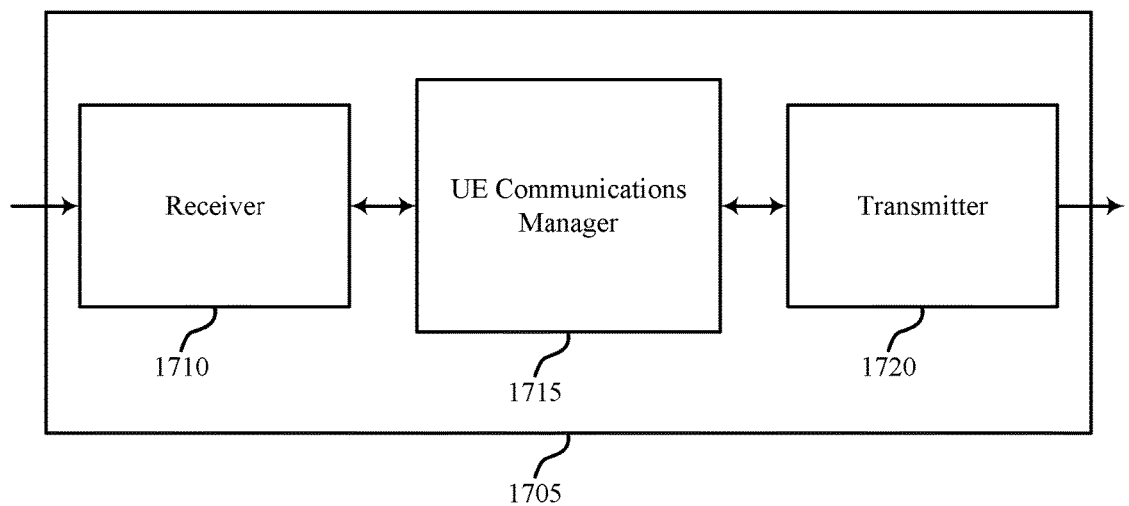
FIGS. 17 through 19 show block diagrams of a device that supports multiple timers used for request to send and clear to send communications in accordance with various aspects of the present disclosure.

FIG. 17 shows a block diagram 1700 of a wireless device 1705 that supports multiple timers for request to send and clear to send communications in accordance with various aspects of the present disclosure. Wireless device 1705 may be an example of aspects of a UE 115 as described with reference to FIG. 1. Wireless device 1705 may include receiver 1710, UE communications manager 1715, and transmitter 1720. Wireless device 1705 may also include a processor. Each of these components may be in communication with one another (e.g., via one or more buses).

Receiver 1710 may receive information such as packets, user data, or control information associated with various information channels (e.g., control channels, data channels, and information related to multiple timers for request to send and clear to send communications). Information may be passed on to other components of the device. The receiver 1710 may be an example of aspects of the transceiver 2035 described with reference to FIG. 20.

UE communications manager 1715 may be an example of aspects of the UE communications manager 2015 described with reference to FIG. 20.

UE communications manager 1715 may determine a first timer based on a duration for transmitting a first RTS message and a duration for receiving a CTS message, transmit the first RTS message associated with the first timer, receive the CTS message before an expiration of the first timer based on the first RTS message, and transmit, in response to receiving the CTS message, a data message having a second timer different from the first timer, the data message associated with a data transmission opportunity for the UE. In some examples, the second timer comprises a NAV timer.

The UE communications manager 1715 and/or at least some of its various sub-components may be implemented in hardware, software executed by a processor, firmware, or any combination thereof. If implemented in software executed by a processor, the functions of the UE communications manager 1715 may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 1715 and/or at least some of its various sub-components may be physically located at various positions, including being distributed such that portions of functions are implemented at different physical locations by one or more physical devices. In some examples, UE communications manager 1715 and/or at least some of its various sub-components may be a separate and distinct component in accordance with various aspects of the present disclosure. In other examples, UE communications manager 1715 and/or at least some of its various sub-components may be combined with one or more other hardware components, including but not limited to a receiver, a transmitter, or a transceiver in accordance with various aspects of the present disclosure.

Transmitter 1720 may transmit signals generated by other components of the device. In some examples, the transmitter 1720 may be collocated with a receiver 1710 in a transceiver module. For example, the transmitter 1720 may be an example of aspects of the transceiver 2035 described with reference to FIG. 20. The transmitter 1720 may include a single antenna, or it may include a set of antennas.

Figure 18:
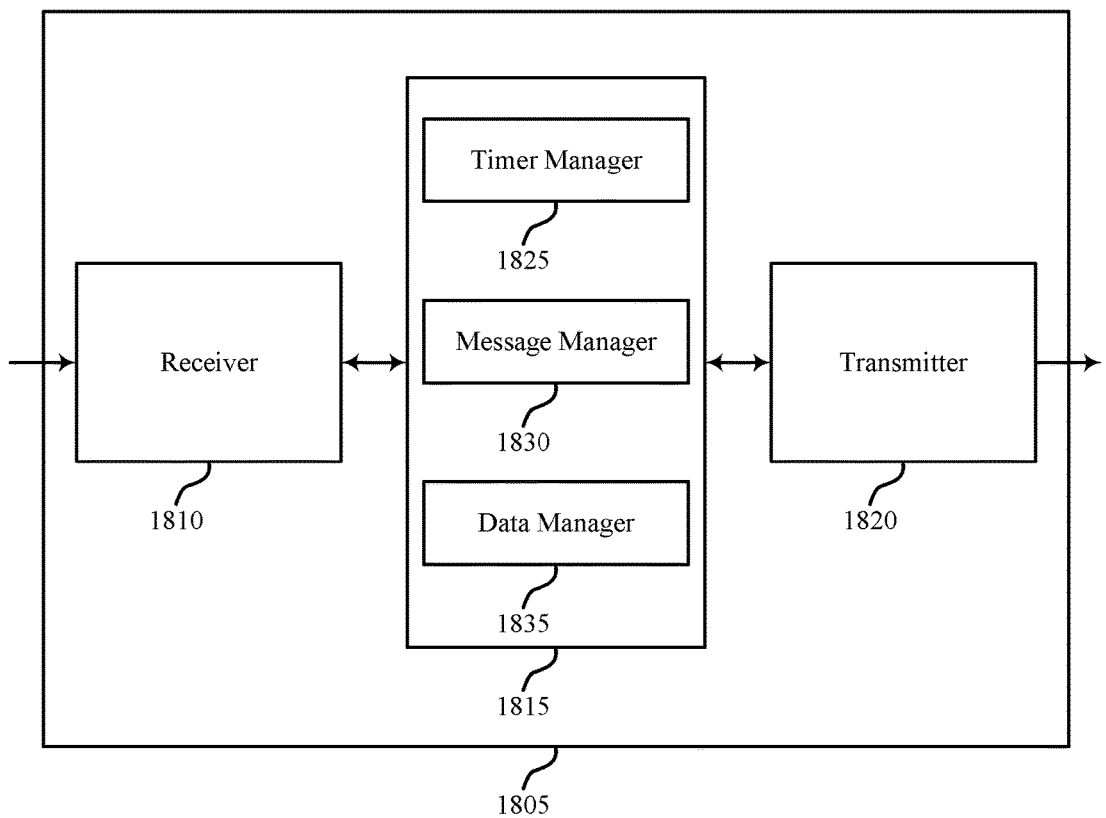

FIG. 18 shows a block diagram 1800 of a wireless device 1805 that supports multiple timers for request to send and clear to send communications in accordance with various aspects of the present disclosure. Wireless device 1805 may be an example of aspects of a wireless device 1705 or a UE 115 as described with reference to FIGS. 1 and 17. Wireless device 1805 may include receiver 1810, UE communications manager 1815, and transmitter 1820. Wireless device 1805 may also include a processor. Each of these components may be in communication with one another (e.g., via one or more buses).

Receiver 1810 may receive information such as packets, user data, or control information associated with various information channels (e.g., control channels, data channels, and information related to multiple timers for request to send and clear to send communications). Information may be passed on to other components of the device. The receiver 1810 may be an example of aspects of the transceiver 2035 described with reference to FIG. 20.

UE communications manager 1815 may be an example of aspects of the UE communications manager 2015 described with reference to FIG. 20.

UE communications manager 1815 may also include timer manager 1825, message manager 1830, and data manager 1835.

Timer manager 1825 may determine a first timer based on a duration for transmitting a first RTS message and a duration for receiving a CTS message, identify a duration of the data transmission opportunity for the UE, determine the second timer based on the duration of the data transmission opportunity, compare a duration of the data message to a threshold, and determine the second timer based on the duration of the data message exceeding the threshold. In some cases, the second timer has a longer duration than the first timer.

Message manager 1830 may transmit the first RTS message associated with the first timer and receive the CTS message before an expiration of the first timer based on the first RTS message. In some cases, transmitting the first RTS message may additionally or alternatively include transmitting the first RTS message using a second set of communication resources different than the first set of communication resources.

Data manager 1835 may transmit, in response to receiving the CTS message, a data message having a second timer different from the first timer, the data message associated with a data transmission opportunity for the UE, set the second timer based on the size being greater than the threshold, determine a size of data associated with the data message, if the size is less than a threshold then: determine the first timer based on the duration for transmitting the first RTS message, the duration for receiving the CTS message, and the duration for transmitting the data message, transmit the first RTS message associated with the first timer, transmit, in response to receiving the CTS message, the data message; and, if the size is greater than the threshold then: determine the first timer based at least in part on the duration for transmitting the first RTS message and the duration for receiving the CTS message, transmit the first RTS message associated with the first timer, receive the CTS message before the expiration of the first timer, transmit, in response to receiving the CTS message, the data message having the second timer different from the first timer, identify a size of data associated with the data message, compare the size to a threshold, where the first timer, or the second timer, or both are based on the comparison, set the second timer based on the size being less than the threshold, and determine the first timer based on the duration for transmitting the first RTS message and the duration for receiving the CTS message. In some cases, the data message includes a second RTS message.

Transmitter 1820 may transmit signals generated by other components of the device. In some examples, the transmitter 1820 may be collocated with a receiver 1810 in a transceiver module. For example, the transmitter 1820 may be an example of aspects of the transceiver 2035 described with reference to FIG. 20. The transmitter 1820 may include a single antenna, or it may include a set of antennas.

The UE communications manager 1815 and/or at least some of its various sub-components may be implemented in hardware, software executed by a processor, firmware, or any combination thereof. If implemented in software executed by a processor, the functions of the UE communications manager 1815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE communications manager 1815 and/or at least some of its various sub-components may be physically located at various positions, including being distributed such that portions of functions are implemented at different physical locations by one or more physical devices. In some examples, UE communications manager 1815 and/or at least some of its various sub-components may be a separate and distinct component in accordance with various aspects of the present disclosure. In other examples, UE communications manager 1815 may be combined with one or more other hardware components, including but not limited to a receiver 1810, a transmitter 1820, a transceiver, a timer manager 1825, a message manager 1830, or a data manager 1835 in accordance with various aspects of the present disclosure.

Figure 19:
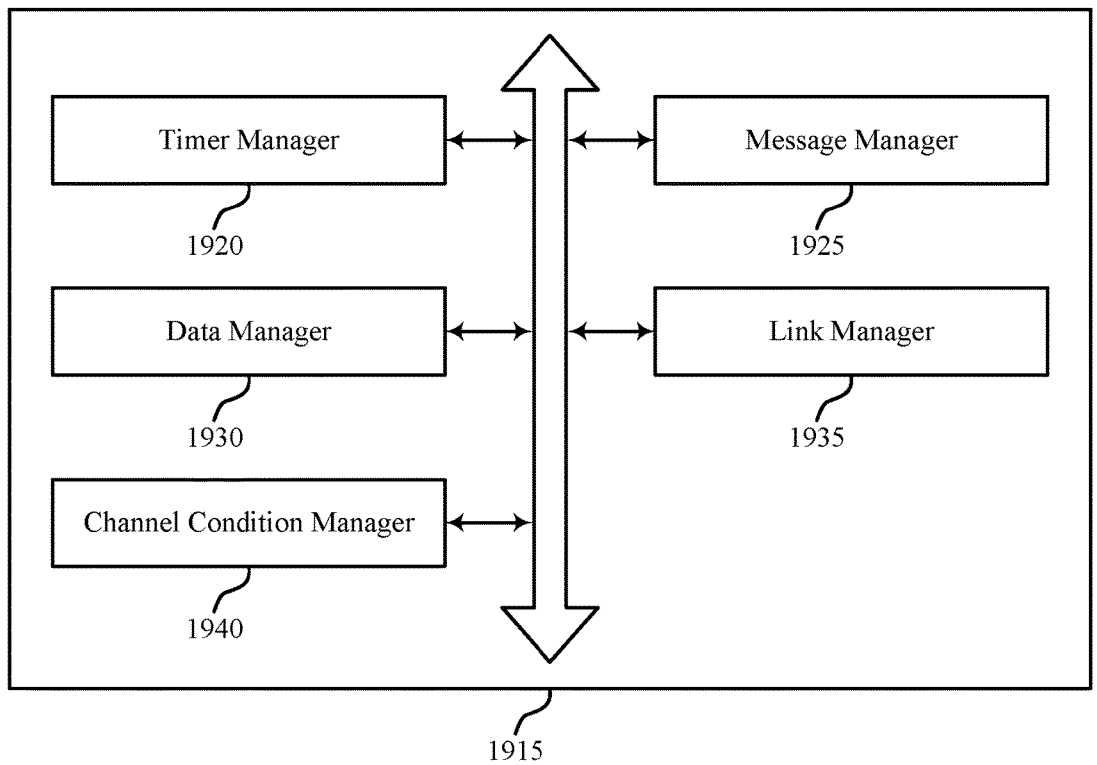

FIG. 19 shows a block diagram 1900 of a UE communications manager 1915 that supports multiple timers for request to send and clear to send communications in accordance with various aspects of the present disclosure. The UE communications manager 1915 may be an example of aspects of a UE communications manager 1715, a UE communications manager 1815, or a UE communications manager 2015 described with reference to FIGS. 17, 18, and 20. The UE communications manager 1915 may include timer manager 1920, message manager 1925, data manager 1930, link manager 1935, and channel condition manager 1940. Each of these modules may communicate, directly or indirectly, with one another (e.g., via one or more buses).

Timer manager 1920 may determine a first timer based on a duration for transmitting a first RTS message and a duration for receiving a CTS message, identify a duration of the data transmission opportunity for the UE, determine the second timer based on the duration of the data transmission opportunity, compare a duration of the data message to a threshold, and determine the second timer based on the duration of the data message exceeding the threshold. In some cases, the second timer has a longer duration than the first timer.

Message manager 1925 may transmit the first RTS message associated with the first timer and receive the CTS message before an expiration of the first timer based on the first RTS message. In some cases, transmitting the first RTS message further includes: transmitting the first RTS message using a second set of communication resources different than the first set of communication resources.

Data manager 1930 may transmit, in response to receiving the CTS message, a data message having a second timer different from the first timer, the data message associated with a data transmission opportunity for the UE, set the second timer based on the size being greater than the threshold, determine a size of data associated with the data message, if the size is less than a threshold then: determine the first timer based on the duration for transmitting the first RTS message, the duration for receiving the CTS message, and the duration for transmitting the data message, transmit the first RTS message associated with the first timer, transmit, in response to receiving the CTS message, the data message; and, if the size is greater than the threshold then: determine the first timer based at least in part on the duration for transmitting the first RTS message and the duration for receiving the CTS message, transmit the first RTS message associated with the first timer, receive the CTS message before the expiration of the first timer, transmit, in response to receiving the CTS message, the data message having the second timer different from the first timer, identify a size of data associated with the data message, compare the size to a threshold, where the first timer, or the second timer, or both are based on the comparison, set the second timer based on the size being less than the threshold, and determine the first timer based on the duration for transmitting the first RTS message and the duration for receiving the CTS message. In some cases, the data message includes a second RTS message.

Link manager 1935 may establish a directional communication link with a base station, the directional communication link using a first set of communication resources and identify that a radio link failure event associated with the directional communication link has occurred, where transmitting the first RTS message is based on identifying that the radio link failure event occurred. In some cases, the first set of communication resources include a RAT. In some cases, the second set of communication resources include a second RAT different from the first RAT. In some cases, the first RTS message, the CTS message, and the data message are transmitted using a cellular radio access technology.

Channel condition manager 1940 may measure a channel condition associated with the directional communication link, where transmitting the first RTS message is based on the measured channel condition associated with the directional communication link.

The UE communications manager 1915 and/or at least some of its various sub-components may be implemented in hardware, software executed by a processor, firmware, or any combination thereof. If implemented in software executed by a processor, the functions of the UE communications manager 1915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE communications manager 1915 and/or at least some of its various sub-components may be physically located at various positions, including being distributed such that portions of functions are implemented at different physical locations by one or more physical devices. In some examples, UE communications manager 1915 and/or at least some of its various sub-components may be a separate and distinct component in accordance with various aspects of the present disclosure. In other examples, UE communications manager 1915 and/or at least some of its various sub-components may be combined with one or more other hardware components, including but not limited to a receiver, a transmitter, a transceiver, a timer manager 1920, a message manager 1925, data manager 1930, a link manager 1935, or a channel condition manager 1940 in accordance with various aspects of the present disclosure.

Figure 20:
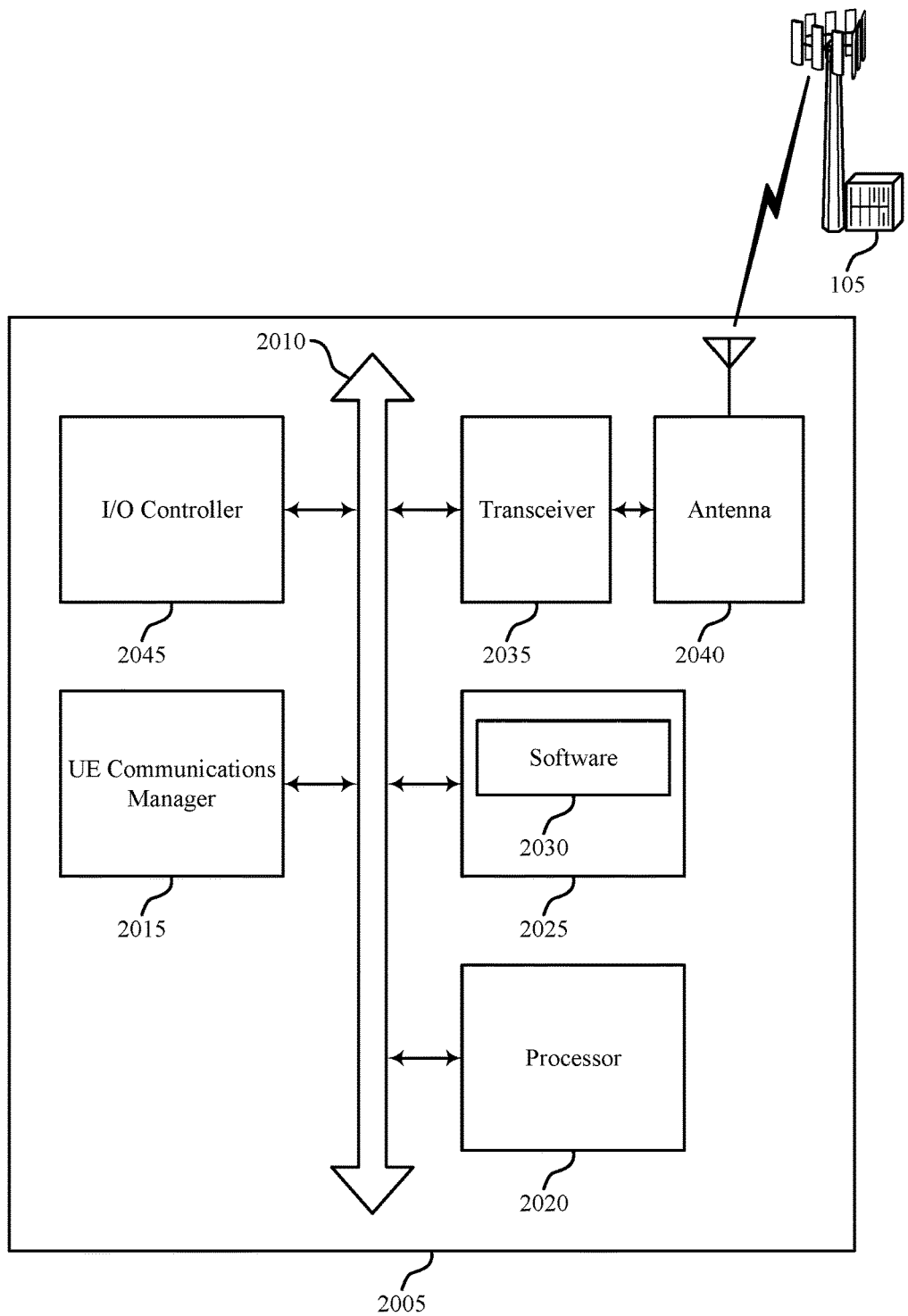
FIG. 20 illustrates a block diagram of a system including a UE that supports multiple timers used for request to send and clear to send communications in accordance with various aspects of the present disclosure.

FIG. 20 shows a diagram of a system 2000 including a device 2005 that supports multiple timers for request to send and clear to send communications in accordance with various aspects of the present disclosure. Device 2005 may be an example of or include the components of wireless device 1705, wireless device 1805, or a UE 115 as described above, e.g., with reference to FIGS. 1, 17 and 18. Device 2005 may include components for bi-directional voice and data communications including components for transmitting and receiving communications, including UE communications manager 2015, processor 2020, memory 2025, software 2030, transceiver 2035, antenna 2040, and I/O controller 2045. These components may be in electronic communication via one or more busses (e.g., bus 2010). Device 2005 may communicate wirelessly with one or more base stations 105.

Processor 2020 may include an intelligent hardware device, (e.g., a general-purpose processor, a DSP, a central processing unit (CPU), a microcontroller, an ASIC an FPGA, a programmable logic device, a discrete gate or transistor logic component, a discrete hardware component, or any combination thereof). In some cases, processor 2020 may be configured to operate a memory array using a memory controller. In other cases, a memory controller may be integrated into processor 2020. Processor 2020 may be configured to execute computer-readable instructions stored in a memory to perform various functions (e.g., functions or tasks supporting multiple timers for request to send and clear to send communications).

Memory 2025 may include random access memory (RAM) and read only memory (ROM). The memory 2025 may store computer-readable, computer-executable software 2030 including instructions that, when executed, cause the processor to perform various functions described herein. In some cases, the memory 2025 may contain, among other things, a basic input/output system (BIOS) which may control basic hardware and/or software operation such as the interaction with peripheral components or devices.

Software 2030 may include code to implement aspects of the present disclosure, including code to support multiple timers for request to send and clear to send communications. Software 2030 may be stored in a non-transitory computer-readable medium such as system memory or other memory. In some cases, the software 2030 may not be directly executable by the processor but may cause a computer (e.g., when compiled and executed) to perform functions described herein.

Transceiver 2035 may communicate bi-directionally, via one or more antennas, wired, or wireless links as described above. For example, the transceiver 2035 may represent a wireless transceiver and may communicate bi-directionally with another wireless transceiver. The transceiver 2035 may also include a modem to modulate the packets and provide the modulated packets to the antennas for transmission, and to demodulate packets received from the antennas.

In some cases, the wireless device may include a single antenna 2040. However, in some cases the device may have more than one antenna 2040, which may be capable of concurrently transmitting or receiving multiple wireless transmissions.

I/O controller 2045 may manage input and output signals for device 2005. I/O controller 2045 may also manage peripherals not integrated into device 2005. In some cases, I/O controller 2045 may represent a physical connection or port to an external peripheral. In some cases, I/O controller 2045 may utilize an operating system such as iOS®, ANDROID®, MS-DOS®, MS-WINDOWS®, OS/2®, UNIX®, LINUX®, or another known operating system.

Figure 21:
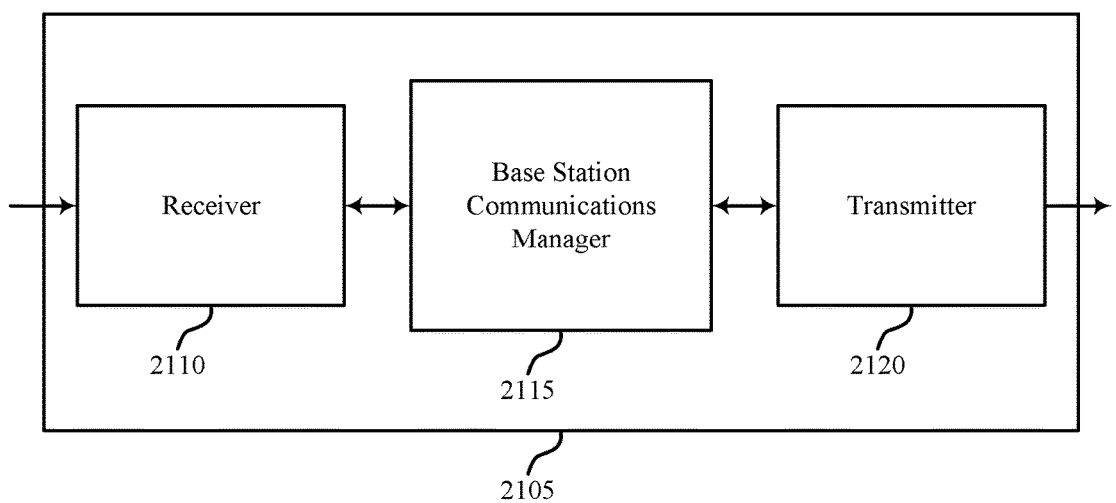
FIGS. 21 through 23 show block diagrams of a device that supports multiple timers used for request to send and clear to send communications in accordance with various aspects of the present disclosure.

FIG. 21 shows a block diagram 2100 of a wireless device 2105 that supports multiple timers for request to send and clear to send communications in accordance with various aspects of the present disclosure. Wireless device 2105 may be an example of aspects of a base station 105 as described with reference to FIG. 1. Wireless device 2105 may include receiver 2110, base station communications manager 2115, and transmitter 2120. Wireless device 2105 may also include a processor. Each of these components may be in communication with one another (e.g., via one or more buses).

Receiver 2110 may receive information such as packets, user data, or control information associated with various information channels (e.g., control channels, data channels, and information related to multiple timers for request to send and clear to send communications). Information may be passed on to other components of the device. The receiver 2110 may be an example of aspects of the transceiver 2435 described with reference to FIG. 24.

Base station communications manager 2115 may be an example of aspects of the base station communications manager 2450 described with reference to FIG. 24.

Base station communications manager 2115 may receive a RTS message having a first timer based on a duration for receiving the RTS message and a duration for transmitting a CTS message, transmit the CTS message before an expiration of the first timer based on the RTS message, and receive a data message having a second timer different from the first timer, the data message associated with a data transmission opportunity for a UE. In some examples, the second timer comprises a NAV timer.

The base station communications manager 2115 and/or at least some of its various sub-components may be implemented in hardware, software executed by a processor, firmware, or any combination thereof. If implemented in software executed by a processor, the functions of the base station communications manager 2115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 2115 and/or at least some of its various sub-components may be physically located at various positions, including being distributed such that portions of functions are implemented at different physical locations by one or more physical devices. In some examples, base station communications manager 2115 and/or at least some of its various sub-components may be a separate and distinct component in accordance with various aspects of the present disclosure. In other examples, base station communications manager 2115 and/or at least some of its various sub-components may be combined with one or more other hardware components, including but not limited to a receiver, a transmitter, or a transceiver in accordance with various aspects of the present disclosure.

Transmitter 2120 may transmit signals generated by other components of the device. In some examples, the transmitter 2120 may be collocated with a receiver 2110 in a transceiver module. For example, the transmitter 2120 may be an example of aspects of the transceiver 2435 described with reference to FIG. 24. The transmitter 2120 may include a single antenna, or it may include a set of antennas.

Figure 22:
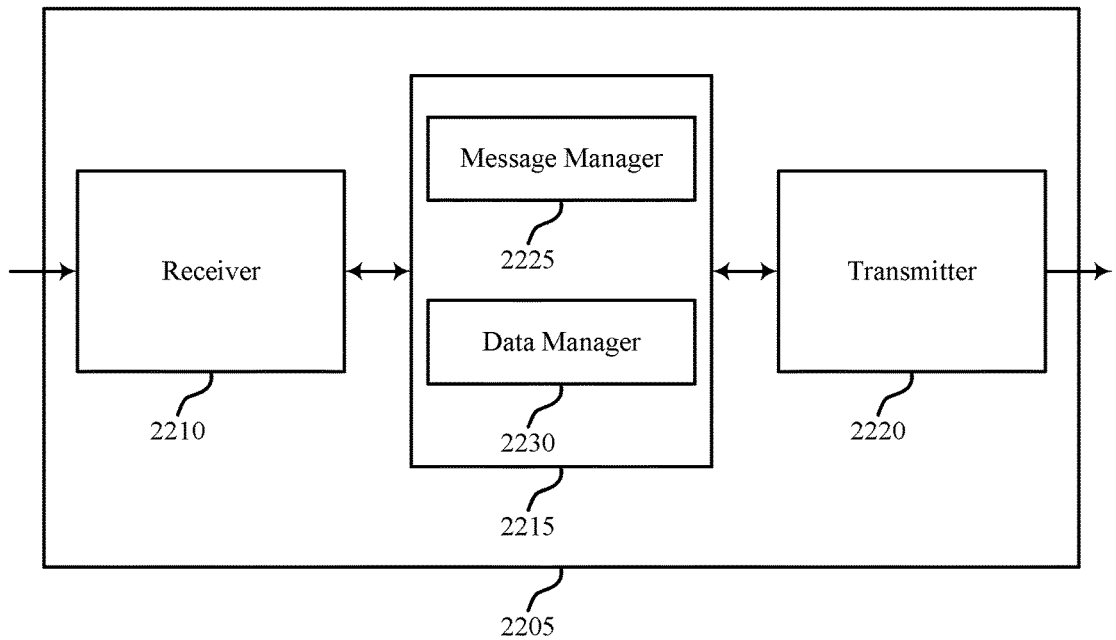

FIG. 22 shows a block diagram 2200 of a wireless device 2205 that supports multiple timers for request to send and clear to send communications in accordance with various aspects of the present disclosure. Wireless device 2205 may be an example of aspects of a wireless device 2105 or a base station 105 as described with reference to FIGS. 1 and 21.

Wireless device 2205 may include receiver 2210, base station communications manager 2215, and transmitter 2220. Wireless device 2205 may also include a processor. Each of these components may be in communication with one another (e.g., via one or more buses).

Receiver 2210 may receive information such as packets, user data, or control information associated with various information channels (e.g., control channels, data channels, and information related to multiple timers for request to send and clear to send communications). Information may be passed on to other components of the device. The receiver 2210 may be an example of aspects of the transceiver 2435 described with reference to FIG. 24.

Base station communications manager 2215 may be an example of aspects of the base station communications manager 2450 described with reference to FIG. 24.

Base station communications manager 2215 may also include message manager 2225 and data manager 2230.

Message manager 2225 may receive a RTS message having a first timer based on a duration for receiving the RTS message and a duration for transmitting a CTS message and transmit the CTS message before an expiration of the first timer based on the RTS message.

Data manager 2230 may receive a data message having a second timer different from the first timer, the data message associated with a data transmission opportunity for a UE and receive the data message during the second timer. In some cases, at least a part of the data message is received from the UE, in response to the second RTS message, before transmitting a second CTS message. In some cases, the data message includes information indicating a duration of the second timer. In some cases, the data message includes a second RTS message.

Transmitter 2220 may transmit signals generated by other components of the device. In some examples, the transmitter 2220 may be collocated with a receiver 2210 in a transceiver module. For example, the transmitter 2220 may be an example of aspects of the transceiver 2435 described with reference to FIG. 24. The transmitter 2220 may include a single antenna, or it may include a set of antennas.

The base station communications manager 2215 and/or at least some of its various sub-components may be implemented in hardware, software executed by a processor, firmware, or any combination thereof. If implemented in software executed by a processor, the functions of the base station communications manager 2215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 2215 and/or at least some of its various sub-components may be physically located at various positions, including being distributed such that portions of functions are implemented at different physical locations by one or more physical devices. In some examples, base station communications manager 2215 and/or at least some of its various sub-components may be a separate and distinct component in accordance with various aspects of the present disclosure. In other examples, base station communications manager 2215 and/or at least some of its various sub-components may be combined with one or more other hardware components, including but not limited to a receiver 2210, a transmitter 2220, a transceiver, a message manager 2225, or a data manager 2230 in accordance with various aspects of the present disclosure.

Figure 23:
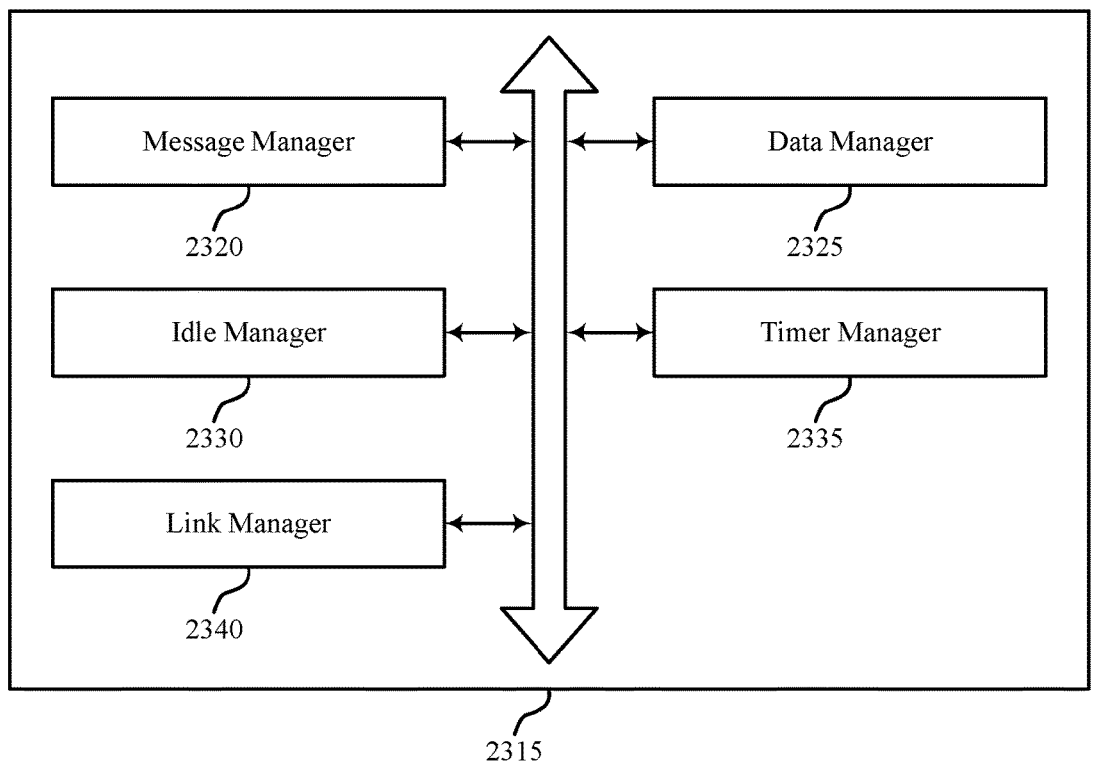

FIG. 23 shows a block diagram 2300 of a base station communications manager 2315 that supports multiple timers for request to send and clear to send communications in accordance with various aspects of the present disclosure. The base station communications manager 2315 may be an example of aspects of a base station communications manager 2450 described with reference to FIGS. 21, 22, and 24. The base station communications manager 2315 may include message manager 2320, data manager 2325, idle manager 2330, timer manager 2335, and link manager 2340. Each of these modules may communicate, directly or indirectly, with one another (e.g., via one or more buses).

Message manager 2320 may receive a RTS message having a first timer based on a duration for receiving the RTS message and a duration for transmitting a CTS message and transmit the CTS message before an expiration of the first timer based on the RTS message.

Data manager 2325 may receive a data message having a second timer different from the first timer, the data message associated with a data transmission opportunity for a UE and receive the data message during the second timer. In some cases, at least a part of the data message is received from the UE, in response to the second RTS message, before transmitting a second CTS message. In some cases, the data message includes information indicating a duration of the second timer. In some cases, the data message includes a second RTS message.

Idle manager 2330 may remain idle during the indicated duration of the second timer in response to receiving the data message.

Timer manager 2335 may be configured to manage timer data. In some cases, the second timer is longer than the first timer.

Link manager 2340 may establish a directional communication link with the UE, the directional communication link using a first set of communication resources, where the RTS message is received using a second set of communication resources different than the first set of communication resources and determine whether a keepalive message has been received from the UE, where transmitting the CTS message is based on the keepalive message.

The base station communications manager 2315 and/or at least some of its various sub-components may be implemented in hardware, software executed by a processor, firmware, or any combination thereof. If implemented in software executed by a processor, the functions of the base station communications manager 2315 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 2315 and/or at least some of its various sub-components may be physically located at various positions, including being distributed such that portions of functions are implemented at different physical locations by one or more physical devices. In some examples, base station communications manager 2315 and/or at least some of its various sub-components may be a separate and distinct component in accordance with various aspects of the present disclosure. In other examples, base station communications manager 2315 and/or at least some of its various sub-components may be combined with one or more other hardware components, including but not limited to a receiver, a transmitter, a transceiver, a message manager 2320, a data manager 2325, an idle manager 2330, a timer manager 2335, or a link manager 2340 in accordance with various aspects of the present disclosure.

Figure 24:
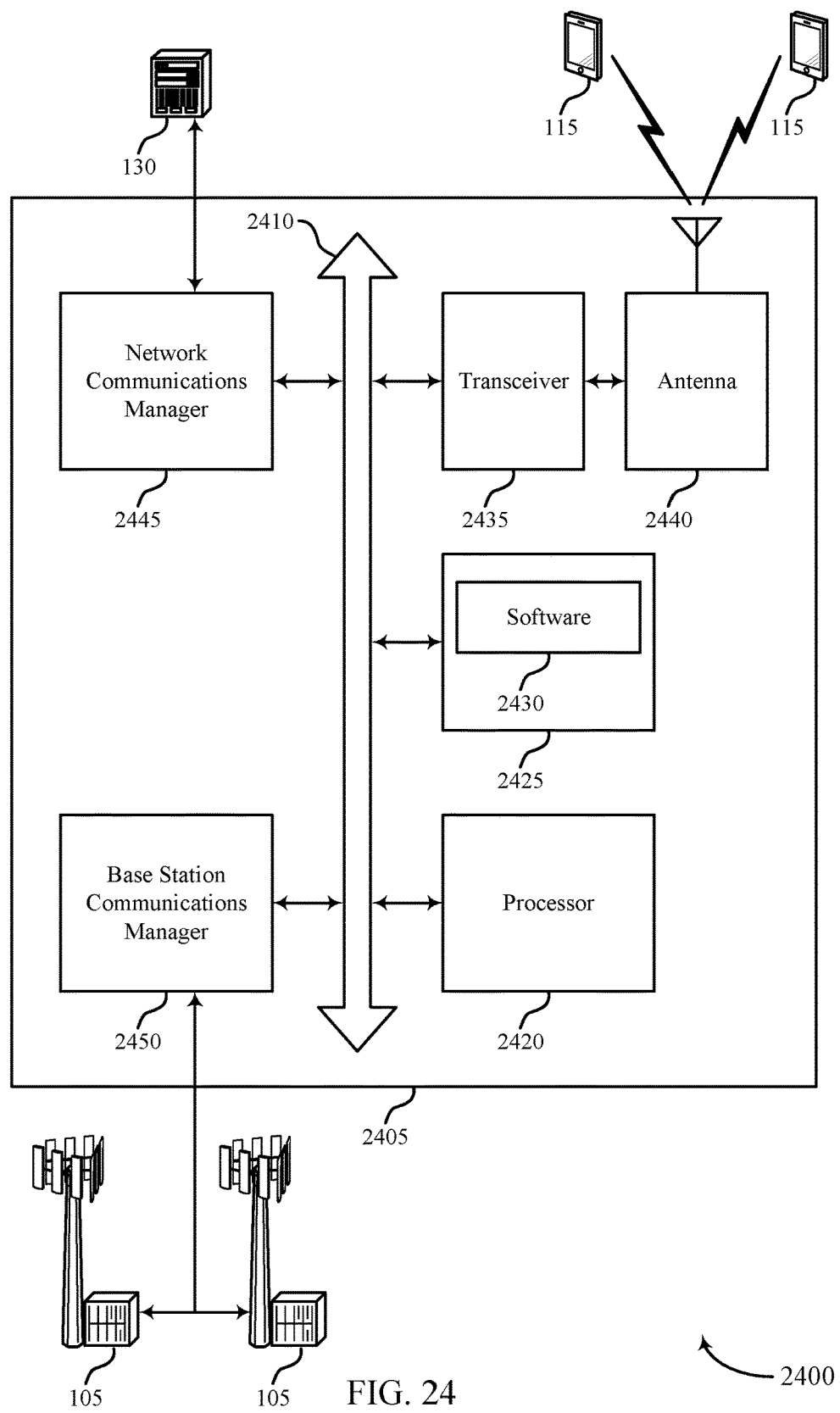
FIG. 24 illustrates a block diagram of a system including a base station that supports multiple timers used for request to send and clear to send communications in accordance with various aspects of the present disclosure.

FIG. 24 shows a diagram of a system 2400 including a device 2405 that supports multiple timers for request to send and clear to send communications in accordance with various aspects of the present disclosure. Device 2405 may be an example of or include the components of base station 105 as described above, e.g., with reference to FIG. 1. Device 2405 may include components for bi-directional voice and data communications including components for transmitting and receiving communications, including base station communications manager 2450, processor 2420, memory 2425, software 2430, transceiver 2435, antenna 2440, network communications manager 2445, and base station communications manager 2450. These components may be in electronic communication via one or more busses (e.g., bus 2410). Device 2405 may communicate wirelessly with one or more UEs 115.

Processor 2420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 2420 may be configured to operate a memory array using a memory controller. In other cases, a memory controller may be integrated into processor 2420. Processor 2420 may be configured to execute computer-readable instructions stored in a memory to perform various functions (e.g., functions or tasks supporting multiple timers for request to send and clear to send communications).

Memory 2425 may include RAM and ROM. The memory 2425 may store computer-readable, computer-executable software 2430 including instructions that, when executed, cause the processor to perform various functions described herein. In some cases, the memory 2425 may contain, among other things, a BIOS which may control basic hardware and/or software operation such as the interaction with peripheral components or devices.

Software 2430 may include code to implement aspects of the present disclosure, including code to support multiple timers for request to send and clear to send communications. Software 2430 may be stored in a non-transitory computer-readable medium such as system memory or other memory. In some cases, the software 2430 may not be directly executable by the processor but may cause a computer (e.g., when compiled and executed) to perform functions described herein.

Transceiver 2435 may communicate bi-directionally, via one or more antennas, wired, or wireless links as described above. For example, the transceiver 2435 may represent a wireless transceiver and may communicate bi-directionally with another wireless transceiver. The transceiver 2435 may also include a modem to modulate the packets and provide the modulated packets to the antennas for transmission, and to demodulate packets received from the antennas.

In some cases, the wireless device may include a single antenna 2440. However, in some cases the device may have more than one antenna 2440, which may be capable of concurrently transmitting or receiving multiple wireless transmissions.

Network communications manager 2445 may manage communications with the core network (e.g., via one or more wired backhaul links). For example, the network communications manager 2445 may manage the transfer of data communications for client devices, such as one or more UEs 115.

Base station communications manager 2450 and/or at least some of its various sub-components may manage communications with other base station 105, and may include a controller or scheduler for controlling communications with UEs 115 in cooperation with other base stations 105. For example, the base station communications manager 2450 and/or at least some of its various sub-components may coordinate scheduling for transmissions to UEs 115 for various interference mitigation techniques such as beamforming or joint transmission. In some examples, base station communications manager 2450 and/or at least some of its various sub-components may provide an X2 interface within an LTE/LTE-A wireless communication network technology to provide communication between base stations 105.

Figure 25:
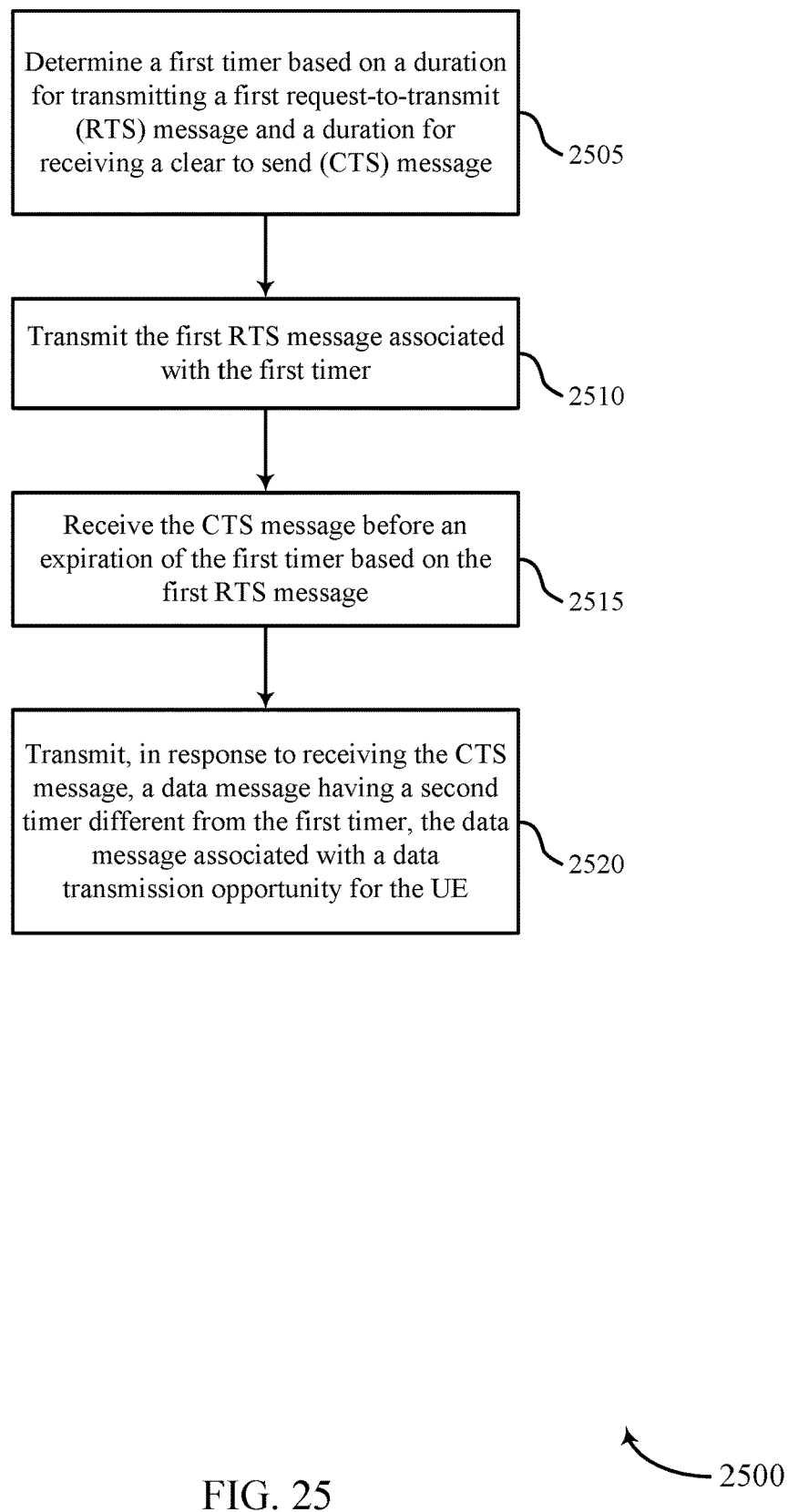
FIGS. 25 through 28 illustrate methods for multiple timers used for request to send and clear to send communications in accordance with various aspects of the present disclosure.

FIG. 25 shows a flowchart illustrating a method 2500 for multiple timers for request to send and clear to send communications in accordance with various aspects of the present disclosure. The operations of method 2500 may be implemented by a UE 115 or its components as described herein. For example, the operations of method 2500 may be performed by a UE communications manager as described with reference to FIGS. 17 through 20. In some examples, a UE 115 may execute a set of codes to control the functional elements of the device to perform the functions described below. Additionally or alternatively, the UE 115 may perform aspects the functions described below using special-purpose hardware.

At block 2505 the UE 115 may determine a first timer based at least in part on a duration for transmitting a first RTS message and a duration for receiving a CTS message. The operations of block 2505 may be performed according to the methods described with reference to FIGS. 1 through 16. In some examples, aspects of the operations of block 2505 may be performed by a timer manager as described with reference to FIGS. 17 through 20.

At block 2510 the UE 115 may transmit the first RTS message associated with the first timer. The operations of block 2510 may be performed according to the methods described with reference to FIGS. 1 through 16. In some examples, aspects of the operations of block 2510 may be performed by a message manager as described with reference to FIGS. 17 through 20.

At block 2515 the UE 115 may receive the CTS message before an expiration of the first timer based at least in part on the first RTS message. The operations of block 2515 may be performed according to the methods described with reference to FIGS. 1 through 16. In some examples, aspects of the operations of block 2515 may be performed by a message manager as described with reference to FIGS. 17 through 20.

At block 2520 the UE 115 may transmit, in response to receiving the CTS message, a data message having a second timer different from the first timer, the data message associated with a data transmission opportunity for the UE. The operations of block 2520 may be performed according to the methods described with reference to FIGS. 1 through 16. In some examples, aspects of the operations of block 2520 may be performed by a data manager as described with reference to FIGS. 17 through 20.

Figure 26:
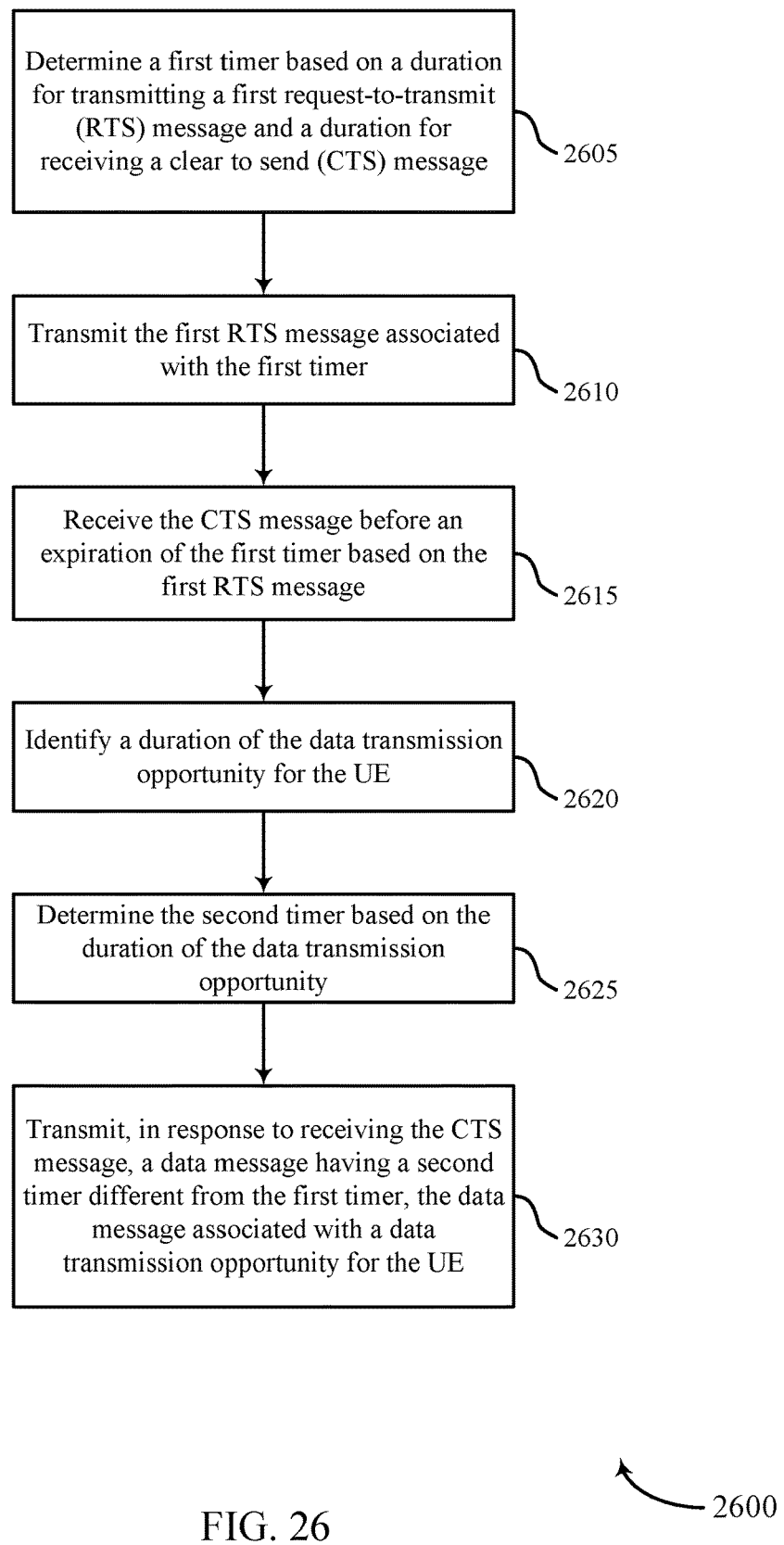

FIG. 26 shows a flowchart illustrating a method 2600 for multiple timers for request to send and clear to send communications in accordance with various aspects of the present disclosure. The operations of method 2600 may be implemented by a UE 115 or its components as described herein. For example, the operations of method 2600 may be performed by a UE communications manager as described with reference to FIGS. 17 through 20. In some examples, a UE 115 may execute a set of codes to control the functional elements of the device to perform the functions described below. Additionally or alternatively, the UE 115 may perform aspects the functions described below using special-purpose hardware.

At block 2605 the UE 115 may determine a first timer based at least in part on a duration for transmitting a first RTS message and a duration for receiving a CTS message. The operations of block 2605 may be performed according to the methods described with reference to FIGS. 1 through 16. In some examples, aspects of the operations of block 2605 may be performed by a timer manager as described with reference to FIGS. 17 through 20.

At block 2610 the UE 115 may transmit the first RTS message associated with the first timer. The operations of block 2610 may be performed according to the methods described with reference to FIGS. 1 through 16. In some examples, aspects of the operations of block 2610 may be performed by a message manager as described with reference to FIGS. 17 through 20.

At block 2615 the UE 115 may receive the CTS message before an expiration of the first timer based at least in part on the first RTS message. The operations of block 2615 may be performed according to the methods described with reference to FIGS. 1 through 16. In some examples, aspects of the operations of block 2615 may be performed by a message manager as described with reference to FIGS. 17 through 20.

At block 2620 the UE 115 may identify a duration of the data transmission opportunity for the UE. The operations of block 2620 may be performed according to the methods described with reference to FIGS. 1 through 16. In some examples, aspects of the operations of block 2620 may be performed by a timer manager as described with reference to FIGS. 17 through 20.

At block 2625 the UE 115 may determine the second timer based at least in part on the duration of the data transmission opportunity. The operations of block 2625 may be performed according to the methods described with reference to FIGS. 1 through 16. In some examples, aspects of the operations of block 2625 may be performed by a timer manager as described with reference to FIGS. 17 through 20.

At block 2630 the UE 115 may transmit, in response to receiving the CTS message, a data message having a second timer different from the first timer, the data message associated with a data transmission opportunity for the UE. The operations of block 2630 may be performed according to the methods described with reference to FIGS. 1 through 16. In some examples, aspects of the operations of block 2630 may be performed by a data manager as described with reference to FIGS. 17 through 20.

Figure 27:
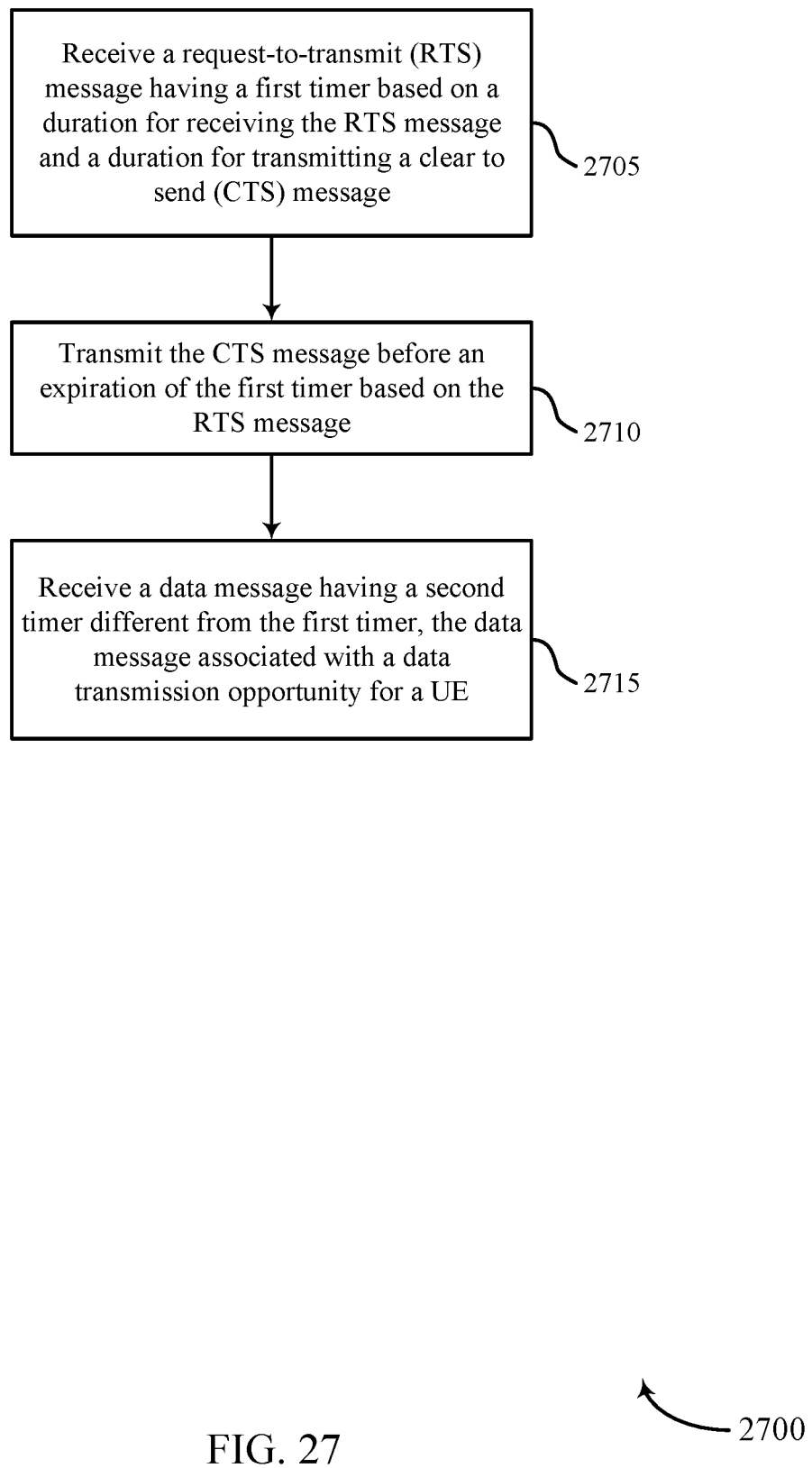

FIG. 27 shows a flowchart illustrating a method 2700 for multiple timers for request to send and clear to send communications in accordance with various aspects of the present disclosure. The operations of method 2700 may be implemented by a base station 105 or its components as described herein. For example, the operations of method 2700 may be performed by a base station communications manager as described with reference to FIGS. 21 through 24. In some examples, a base station 105 may execute a set of codes to control the functional elements of the device to perform the functions described below. Additionally or alternatively, the base station 105 may perform aspects the functions described below using special-purpose hardware.

At block 2705 the base station 105 may receive a RTS message having a first timer based at least in part on a duration for receiving the RTS message and a duration for transmitting a CTS message. The operations of block 2705 may be performed according to the methods described with reference to FIGS. 1 through 16. In some examples, aspects of the operations of block 2705 may be performed by a message manager as described with reference to FIGS. 21 through 24.

At block 2710 the base station 105 may transmit the CTS message before an expiration of the first timer based at least in part on the RTS message. The operations of block 2710 may be performed according to the methods described with reference to FIGS. 1 through 16. In some examples, aspects of the operations of block 2710 may be performed by a message manager as described with reference to FIGS. 21 through 24.

At block 2715 the base station 105 may receive a data message having a second timer different from the first timer, the data message associated with a data transmission opportunity for a UE. The operations of block 2715 may be performed according to the methods described with reference to FIGS. 1 through 16. In some examples, aspects of the operations of block 2715 may be performed by a data manager as described with reference to FIGS. 21 through 24.

Figure 28:
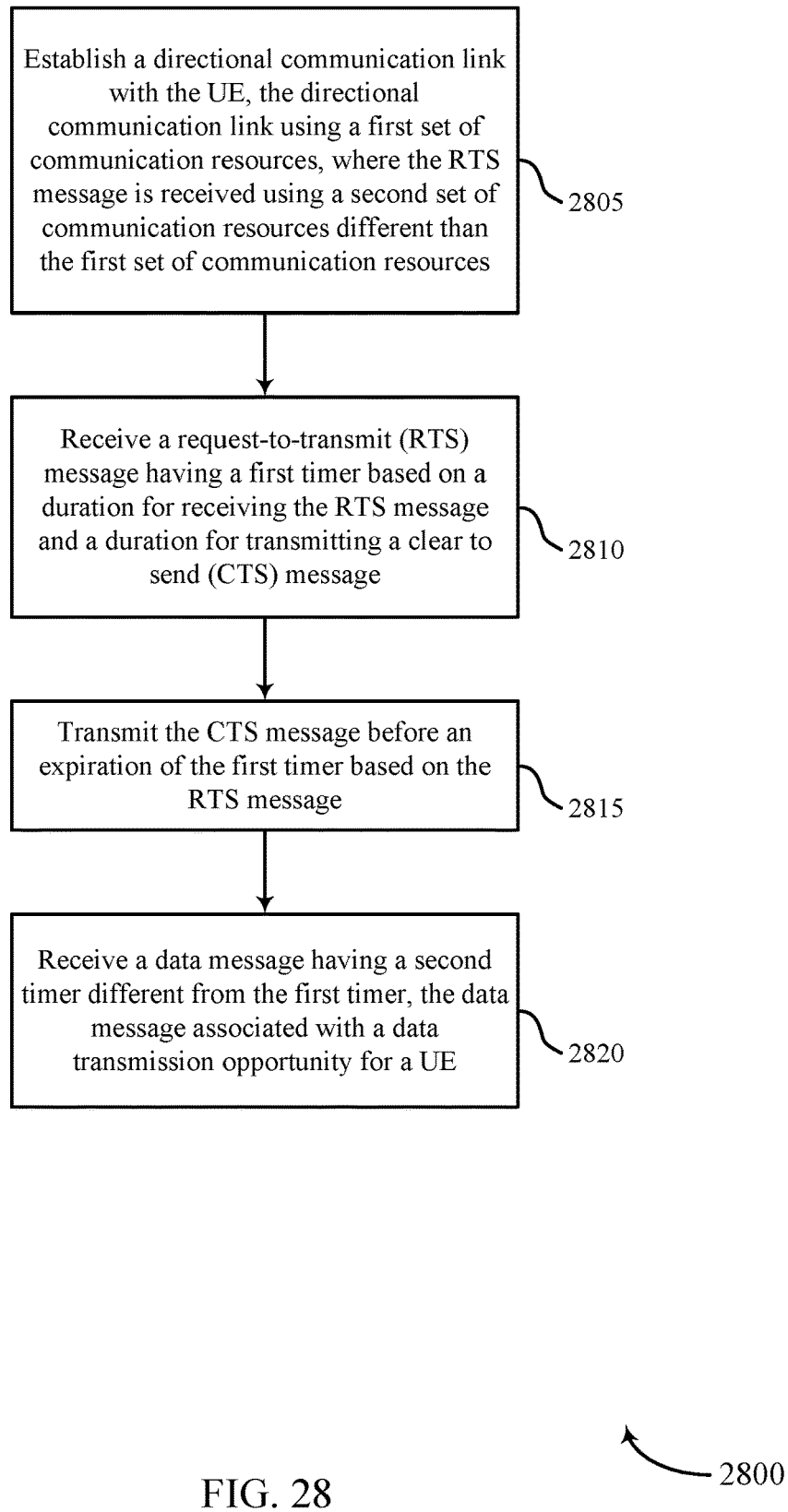

FIG. 28 shows a flowchart illustrating a method 2800 for multiple timers for request to send and clear to send communications in accordance with various aspects of the present disclosure. The operations of method 2800 may be implemented by a base station 105 or its components as described herein. For example, the operations of method 2800 may be performed by a base station communications manager as described with reference to FIGS. 21 through 24. In some examples, a base station 105 may execute a set of codes to control the functional elements of the device to perform the functions described below. Additionally or alternatively, the base station 105 may perform aspects the functions described below using special-purpose hardware.

At block 2805 the base station 105 may establish a directional communication link with the UE, the directional communication link using a first set of communication resources, wherein the RTS message is received using a second set of communication resources different than the first set of communication resources. The operations of block 2805 may be performed according to the methods described with reference to FIGS. 1 through 16. In some examples, aspects of the operations of block 2805 may be performed by a link manager as described with reference to FIGS. 21 through 24.

At block 2810 the base station 105 may receive a RTS message having a first timer based at least in part on a duration for receiving the RTS message and a duration for transmitting a CTS message. The operations of block 2810 may be performed according to the methods described with reference to FIGS. 1 through 16. In some examples, aspects of the operations of block 2810 may be performed by a message manager as described with reference to FIGS. 21 through 24.

At block 2815 the base station 105 may transmit the CTS message before an expiration of the first timer based at least in part on the RTS message. The operations of block 2815 may be performed according to the methods described with reference to FIGS. 1 through 16. In some examples, aspects of the operations of block 2815 may be performed by a message manager as described with reference to FIGS. 21 through 24.

At block 2820 the base station 105 may receive a data message having a second timer different from the first timer, the data message associated with a data transmission opportunity for a UE. The operations of block 2820 may be performed according to the methods described with reference to FIGS. 1 through 16. In some examples, aspects of the operations of block 2820 may be performed by a data manager as described with reference to FIGS. 21 through 24.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes examples and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Additionally or alternatively, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such example).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a user equipment (UE), comprising:
    determining a first timer based at least in part on a duration for transmitting a first request to send (RTS) message and a duration for receiving a clear to send (CTS) message;
    transmitting the first RTS message associated with the first timer;
    receiving the CTS message before an expiration of the first timer based at least in part on the first RTS message; and
    transmitting, in response to receiving the CTS message, a data message having a second timer different from the first timer, the data message associated with a data transmission opportunity for the UE.

2. The method of claim 1, wherein the second timer comprises a network allocation vector (NAV) timer.

3. The method of claim 1, wherein the data message comprises a second RTS message.

4. The method of claim 1, wherein the second timer has a longer duration than the first timer.

5. The method of claim 1, further comprising:
    identifying a duration of the data transmission opportunity for the UE; and
    determining the second timer based at least in part on the duration of the data transmission opportunity.

6. The method of claim 1, further comprising:
    establishing a directional communication link with a base station, the directional communication link using a first set of communication resources.

7. The method of claim 6, further comprising:
    measuring a channel condition associated with the directional communication link, wherein transmitting the first RTS message is based at least in part on the measured channel condition associated with the directional communication link.

8. The method of claim 6, further comprising:
    identifying that a radio link failure event associated with the directional communication link has occurred, wherein transmitting the first RTS message is based at least in part on identifying that the radio link failure event occurred.

9. The method of claim 6, wherein transmitting the first RTS message further comprises:
    transmitting the first RTS message using a second set of communication resources different than the first set of communication resources.

10. The method of claim 9, wherein:
    the first set of communication resources comprise a first radio access technology (RAT); and
    the second set of communication resources comprise a second RAT different from the first RAT.

11. The method of claim 1, wherein the first RTS message, the CTS message, and the data message are transmitted using a cellular radio access technology.

12. The method of claim 1, further comprising:
    comparing a duration of the data message to a threshold; and
    determining the second timer based at least in part on the duration of the data message exceeding the threshold.

13. The method of claim 1, further comprising:
    determining a size of data associated with the data message, if the size is less than a threshold then:
        determining the first timer based at least in part on the duration for transmitting the first RTS message, the duration for receiving the CTS message, and the duration for transmitting the data message;
        transmitting the first RTS message associated with the first timer; and
        transmitting, in response to receiving the CTS message, the data message; and;
    if the size is greater than the threshold then:
        determining the first timer based at least in part on the duration for transmitting the first RTS message and the duration for receiving the CTS message;
        transmitting the first RTS message associated with the first timer;
        receiving the CTS message before the expiration of the first timer; and
        transmitting, in response to receiving the CTS message, the data message having the second timer different from the first timer.

14. The method of claim 1, further comprising:
    identifying a size of data associated with the data message; and
    comparing the size to a threshold, wherein the first timer, or the second timer, or both are based at least in part on the comparison.

15. The method of claim 14, further comprising:
    setting the second timer based at least in part on the size being less than the threshold.

16. The method of claim 14, further comprising:
    setting the second timer based at least in part on the size being greater than the threshold.

17. A method for wireless communication by a base station, comprising:

receiving a request to send (RTS) message having a first timer based at least in part on a duration for receiving the RTS message and a duration for transmitting a clear to send (CTS) message;

transmitting the CTS message before an expiration of the first timer based at least in part on the RTS message; and receiving a data message having a second timer different from the first timer, the data message associated with a data transmission opportunity for a user equipment (UE).

18. The method of claim 17, wherein the second timer comprises a network allocation vector (NAV) timer.

19. The method of claim 17, further comprising:
receiving the data message during the second timer.

20. The method of claim 17, wherein at least a part of the data message is received from the UE, in response to the second RTS message, before transmitting a second CTS message.

21. The method of claim 17, wherein the data message comprises information indicating a duration of the second timer.

22. The method of claim 21, further comprising:
remaining idle during the indicated duration of the second timer in response to receiving the data message.

23. The method of claim 17, wherein the second timer is longer than the first timer.

24. The method of claim 17, wherein the data message comprises a second RTS message.

25. The method of claim 17, further comprising:
establishing a directional communication link with the UE, the directional communication link using a first set of communication resources, wherein the RTS message is received using a second set of communication resources different than the first set of communication resources.

26. The method of claim 17, further comprising:
determining whether a keepalive message has been received from the UE, wherein transmitting the CTS message is based at least in part on the keepalive message.

27. An apparatus for wireless communication by a user equipment (UE), comprising:
means for determining a first timer based at least in part on a duration for transmitting a first request to send (RTS) message and a duration for receiving a clear to send (CTS) message;
means for transmitting the first RTS message associated with the first timer;
means for receiving the CTS message before an expiration of the first timer based at least in part on the first RTS message; and
means for transmitting, in response to receiving the CTS message, a data message having a second timer different from the first timer, the data message associated with a data transmission opportunity for the UE.

28. The apparatus of claim 27, wherein the second timer comprises a network allocation vector (NAV) timer.

29. The apparatus of claim 27, wherein the data message comprises a second RTS message.

30. The apparatus of claim 27, wherein the second timer has a longer duration than the first timer.

31. The apparatus of claim 27, wherein the data message comprises information indicating a duration of the second timer.

32. The apparatus of claim 27, further comprising:
means for identifying a duration of the data transmission opportunity for the UE; and
means for determining the second timer based at least in part on the duration of the data transmission opportunity.

33. The apparatus of claim 27, further comprising:
means for establishing a directional communication link with a base station, the directional communication link using a first set of communication resources.

34. The apparatus of claim 33, further comprising:
means for measuring a channel condition associated with the directional communication link, wherein transmitting the first RTS message is based at least in part on the measured channel condition associated with the directional communication link.

35. The apparatus of claim 33, further comprising:
means for identifying that a radio link failure event associated with the directional communication link has occurred, wherein transmitting the first RTS message is based at least in part on identifying that the radio link failure event occurred.

36. The apparatus of claim 33, wherein transmitting the first RTS message further comprises: transmitting the first RTS message using a second set of communication resources different than the first set of communication resources.

37. The apparatus of claim 36, wherein:
the first set of communication resources comprise a first radio access technology (RAT); and
the second set of communication resources comprise a second RAT different from the first RAT.

38. The apparatus of claim 27, wherein the first RTS message, the CTS message, and the data message are transmitted using a cellular radio access technology.

39. The apparatus of claim 27, further comprising:
means for comparing a duration of the data message to a threshold; and
means for determining the second timer based at least in part on the duration of the data message exceeding the threshold.

40. The apparatus of claim 27, further comprising:
means for determining a size of data associated with the data message, if the size is less than a threshold then:
means for determining the first timer based at least in part on the duration for transmitting the first RTS message, the duration for receiving the CTS message, and the duration for transmitting the data message;
means for transmitting the first RTS message associated with the first timer; and
means for transmitting, in response to receiving the CTS message, the data message; and;
if the size is greater than the threshold then:
means for determining the first timer based at least in part on the duration for transmitting the first RTS message and the duration for receiving the CTS message;
means for transmitting the first RTS message associated with the first timer;
means for receiving the CTS message before the expiration of the first timer; and
means for transmitting, in response to receiving the CTS message, the data message having the second timer different from the first timer.

41. The apparatus of claim 27, further comprising:
means for identifying a size of data associated with the data message; and means for comparing the size to a threshold, wherein the first timer, or the second timer, or both are based at least in part on the comparison.

42. The apparatus of claim 41, further comprising:
means for setting the second timer based at least in part on the size being less than the threshold.

43. The apparatus of claim 41, further comprising:
means for setting the second timer based at least in part on the size being greater than the threshold.

44. An apparatus for wireless communication by a base station, comprising:
means for receiving a request to send (RTS) message having a first timer based at least in part on a duration for receiving the RTS message and a duration for transmitting a clear to send (CTS) message;
means for transmitting the CTS message before an expiration of the first timer based at least in part on the RTS message; and
means for receiving a data message having a second timer different from the first timer, the data message associated with a data transmission opportunity for a user equipment (UE).

45. The apparatus of claim 44, wherein the second timer comprises a network allocation vector (NAV) timer.

46. The apparatus of claim 44, further comprising:
means for receiving the data message during the second timer.

47. The apparatus of claim 44, wherein at least a part of the data message is received from the UE, in response to the second RTS message, before transmitting a second CTS message.

48. The apparatus of claim 44, wherein the data message comprises information indicating a duration of the second timer.

49. The apparatus of claim 48, further comprising:
means for remaining idle during the indicated duration of the second timer in response to receiving the data message.

50. The apparatus of claim 44, wherein the second timer is longer than the first timer.

51. The apparatus of claim 44, wherein the data message comprises a second RTS message.

52. The apparatus of claim 44, further comprising:
means for establishing a directional communication link with the UE, the directional communication link using a first set of communication resources, wherein the RTS message is received using a second set of communication resources different than the first set of communication resources.

53. The apparatus of claim 44, further comprising:
means for determining whether a keepalive message has been received from the UE, wherein transmitting the CTS message is based at least in part on the keepalive message.

54. An apparatus for wireless communication by a user equipment (UE), in a system comprising:
a processor;
memory in electronic communication with the processor; and
instructions stored in the memory and operable, when executed by the processor, to cause the apparatus to:
determine a first timer based at least in part on a duration for transmitting a first request to send (RTS) message and a duration for receiving a clear to send (CTS) message;
transmit the first RTS message associated with the first timer;
receive the CTS message before an expiration of the first timer based at least in part on the first RTS message; and
transmit, in response to receiving the CTS message, a data message having a second timer different from the first timer, the data message associated with a data transmission opportunity for the UE.

55. The apparatus of claim 54, wherein the second timer comprises a network allocation vector (NAV) timer.

56. The apparatus of claim 54, wherein the data message comprises a second RTS message.

57. The apparatus of claim 54, wherein the second timer has a longer duration than the first timer.

58. The apparatus of claim 54, wherein the data message comprises information indicating a duration of the second timer.

59. The apparatus of claim 54, wherein the instructions are further executable by the processor to cause the apparatus to:
identify a duration of the data transmission opportunity for the UE; and
determine the second timer based at least in part on the duration of the data transmission opportunity.

60. The apparatus of claim 54, wherein the instructions are further executable by the processor to cause the apparatus to:
establish a directional communication link with a base station, the directional communication link using a first set of communication resources.

61. The apparatus of claim 60, wherein the instructions are further executable by the processor to cause the apparatus to:
measure a channel condition associated with the directional communication link, wherein transmitting the first RTS message is based at least in part on the measured channel condition associated with the directional communication link.

62. The apparatus of claim 60, wherein the instructions are further executable by the processor to cause the apparatus to:
identify that a radio link failure event associated with the directional communication link has occurred, wherein transmitting the first RTS message is based at least in part on identifying that the radio link failure event occurred.

63. The apparatus of claim 60, wherein transmitting the first RTS message further comprises: transmitting the first RTS message using a second set of communication resources different than the first set of communication resources.

64. The apparatus of claim 63, wherein:
the first set of communication resources comprise a first radio access technology (RAT); and
the second set of communication resources comprise a second RAT different from the first RAT.

65. The apparatus of claim 54, wherein the first RTS message, the CTS message, and the data message are transmitted using a cellular radio access technology.

66. The apparatus of claim 54, wherein the instructions are further executable by the processor to cause the apparatus to:
compare a duration of the data message to a threshold; and
determine the second timer based at least in part on the duration of the data message exceeding the threshold.

67. The apparatus of claim 54, wherein the instructions are further executable by the processor to cause the apparatus to:

determine a size of data associated with the data message, if the size is less than a threshold then:
  determine the first timer based at least in part on the duration for transmitting the first RTS message, the duration for receiving the CTS message, and the duration for transmitting the data message;
  transmit the first RTS message associated with the first timer; and
  transmit, in response to receiving the CTS message, the data message; and;
if the size is greater than the threshold then:
  determine the first timer based at least in part on the duration for transmitting the first RTS message and the duration for receiving the CTS message;
  transmit the first RTS message associated with the first timer;
  receive the CTS message before the expiration of the first timer; and
  transmit, in response to receiving the CTS message, the data message having the second timer different from the first timer.

68. The apparatus of claim 54, wherein the instructions are further executable by the processor to cause the apparatus to:
  identify a size of data associated with the data message; and
  compare the size to a threshold, wherein the first timer, or the second timer, or both are based at least in part on the comparison.

69. The apparatus of claim 68, wherein the instructions are further executable by the processor to cause the apparatus to:
  set the second timer based at least in part on the size being less than the threshold.

70. The apparatus of claim 68, wherein the instructions are further executable by the processor to cause the apparatus to:
  set the second timer based at least in part on the size being greater than the threshold.

71. The apparatus of claim 54, further comprising an antenna, or a display, or a user interface, or a combination thereof.

72. An apparatus for wireless communication by a base station, in a system comprising:
  a processor;
  memory in electronic communication with the processor; and
  instructions stored in the memory and operable, when executed by the processor, to cause the apparatus to:
    receive a request to send (RTS) message having a first timer based at least in part on a duration for receiving the RTS message and a duration for transmitting a clear to send (CTS) message;
    transmit the CTS message before an expiration of the first timer based at least in part on the RTS message; and
    receive a data message having a second timer different from the first timer, the data message associated with a data transmission opportunity for a user equipment (UE).

73. The apparatus of claim 72, wherein the second timer comprises a network allocation vector (NAV) timer.

74. The apparatus of claim 72, wherein the instructions are further executable by the processor to cause the apparatus to:
  receive the data message during the second timer.

75. The apparatus of claim 72, wherein at least a part of the data message is received from the UE, in response to the second RTS message, before transmitting a second CTS message.

76. The apparatus of claim 72, wherein the data message comprises information indicating a duration of the second timer.

77. The apparatus of claim 76, wherein the instructions are further executable by the processor to cause the apparatus to:
  remain idle during the indicated duration of the second timer in response to receiving the data message.

78. The apparatus of claim 72, wherein the second timer is longer than the first timer.

79. The apparatus of claim 72, wherein the data message comprises a second RTS message.

80. The apparatus of claim 72, wherein the instructions are further executable by the processor to cause the apparatus to:
  establish a directional communication link with the UE, the directional communication link using a first set of communication resources, wherein the RTS message is received using a second set of communication resources different than the first set of communication resources.

81. The apparatus of claim 72, wherein the instructions are further executable by the processor to cause the apparatus to:
  determine whether a keepalive message has been received from the UE, wherein transmitting the CTS message is based at least in part on the keepalive message.

82. The apparatus of claim 72, further comprising an antenna, or a display, or a user interface, or a combination thereof.

83. A non-transitory computer readable medium storing code for wireless communication by a user equipment (UE), the code comprising instructions executable by a processor to:
  determine a first timer based at least in part on a duration for transmitting a first request to send (RTS) message and a duration for receiving a clear to send (CTS) message;
  transmit the first RTS message associated with the first timer;
  receive the CTS message before an expiration of the first timer based at least in part on the first RTS message; and
  transmit, in response to receiving the CTS message, a data message having a second timer different from the first timer, the data message associated with a data transmission opportunity for the UE.

84. The non-transitory computer readable medium of claim 83, wherein the second timer comprises a network allocation vector (NAV) timer.

85. A non-transitory computer readable medium storing code for wireless communication by a base station, the code comprising instructions executable by a processor to:
  receive a request to send (RTS) message having a first timer based at least in part on a duration for receiving the RTS message and a duration for transmitting a clear to send (CTS) message;
  transmit the CTS message before an expiration of the first timer based at least in part on the RTS message; and
  receive a data message having a second timer different from the first timer, the data message associated with a data transmission opportunity for a user equipment (UE).

86. The non-transitory computer readable medium of claim 85, wherein the second timer comprises a network allocation vector (NAV) timer.

\* \* \* \* \*